(12) United States Patent  (10) Patent No.: US 8,306,339 B2
Fukuhara et al.  (45) Date of Patent: Nov. 6, 2012

(54) INFORMATION PROCESSING DEVICE AND METHOD

(75) Inventors: Takahiro Fukuhara, Kanagawa (JP); Junya Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 612 days.

(21) Appl. No.: 12/555,313

(22) Filed: Sep. 8, 2009

(65) Prior Publication Data

US 2010/0092097 A1    Apr. 15, 2010

(30) Foreign Application Priority Data

Oct. 10, 2008  (JP) ................................. 2008-263470

(51) Int. Cl.
*G06K 9/32* (2006.01)
(52) U.S. Cl. ....................................................... 382/232
(58) Field of Classification Search ........... 382/254–275
See application file for complete search history.

(56) References Cited

U.S. PATENT DOCUMENTS

| | | | |
|---|---|---|---|
| 6,539,056 | B1 | 3/2003 | Sato et al. |
| 6,987,890 | B2 | 1/2006 | Joshi et al. |
| 6,990,245 | B2 | 1/2006 | Fukuhara et al. |
| 7,106,366 | B2 | 9/2006 | Parker et al. |
| 7,200,277 | B2 | 4/2007 | Joshi et al. |
| 7,298,910 | B2 | 11/2007 | Fukuhara et al. |
| 2001/0028748 | A1* | 10/2001 | Sato et al. ............. 382/239 |
| 2002/0003905 | A1* | 1/2002 | Sato et al. ............. 382/240 |

FOREIGN PATENT DOCUMENTS

| | | |
|---|---|---|
| JP | 9-200532 | 7/1997 |
| JP | 2001-102935 | 4/2001 |
| JP | 2003-125333 | 4/2003 |
| JP | 2004-282760 | 10/2004 |
| JP | 2004-304656 | 10/2004 |
| JP | 2006-303689 | 11/2006 |
| JP | 2007-28531 | 2/2007 |
| JP | 4016166 | 9/2007 |
| JP | 2008-228208 | 9/2008 |

OTHER PUBLICATIONS

Japanese Office Action issued Mar. 29, 2011, in Patent Application No. 2008-263470.
Office Action issued Aug. 3, 2010, in Japan Patent Application No. 2008-263470.

* cited by examiner

*Primary Examiner* — Alex Liew
(74) *Attorney, Agent, or Firm* — Oblon, Spivak, McClelland, Maier & Neustadt, L.L.P.

(57) ABSTRACT

Disclosed herein is an information processing device including a bitplane expanding section, a coding section, a selecting section, and a selection controlling section. The bitplane expanding section expands image data into bitplanes as sets of bits at identical places in each unit of a predetermined number of pieces of data each having a bit depth of a plurality of bits. The coding section codes the image data expanded by the bitplane expanding section in each the bitplane in predetermined order. The selecting section selects compressed data and non-compressed data as a result of coding of the image data. The selection controlling section controls the coding section to stop a coding process and selecting the non-compressed data for a bitplane situated at a position subsequent to a bitplane for which the non-compressed data is selected by the selecting section in the predetermined order.

17 Claims, 23 Drawing Sheets

DIVISION LEVEL = 3
(H: HIGH FREQUENCIES,
 L: LOW FREQUENCIES)

CODE BLOCK
(EXAMPLE) 64×64

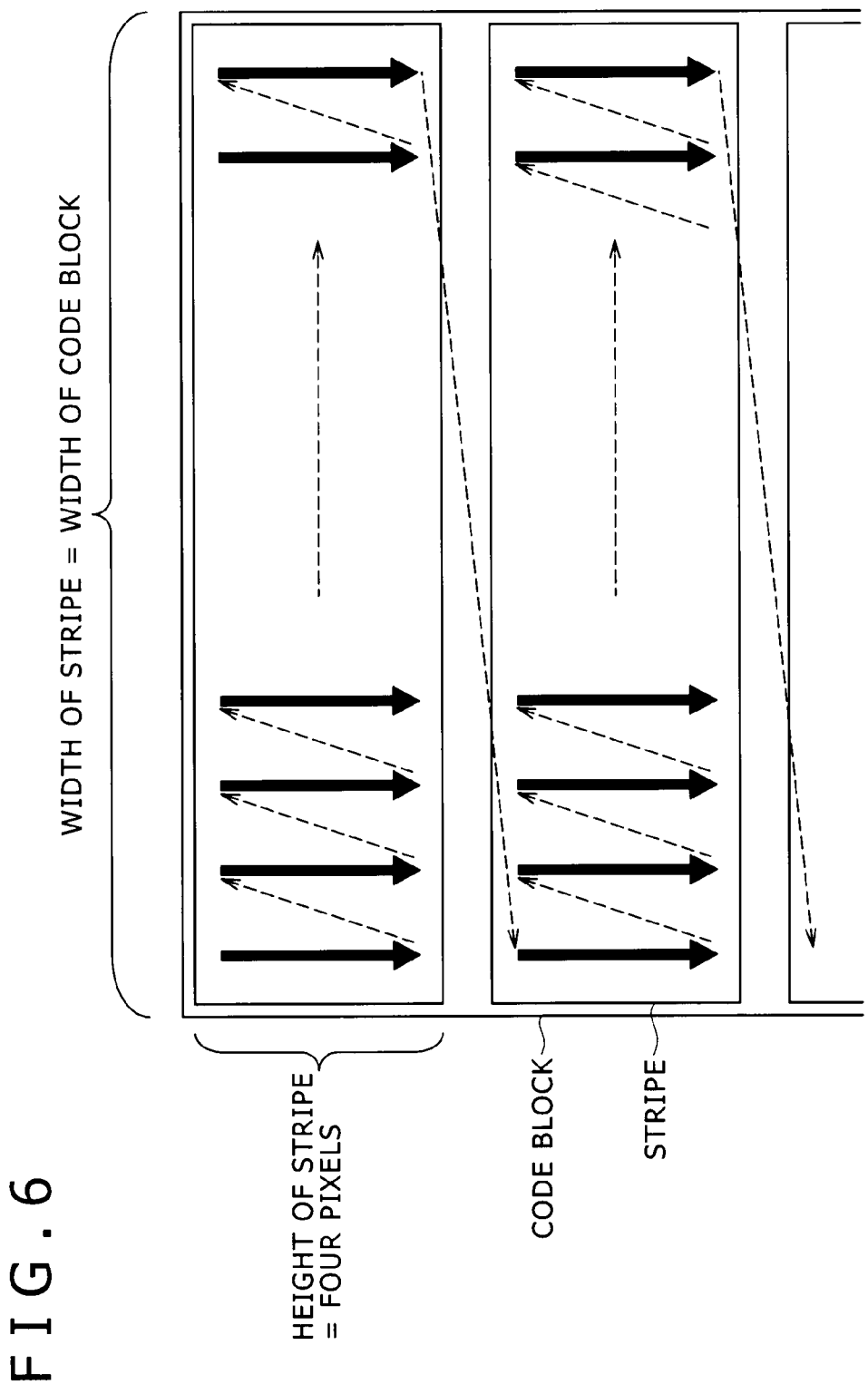

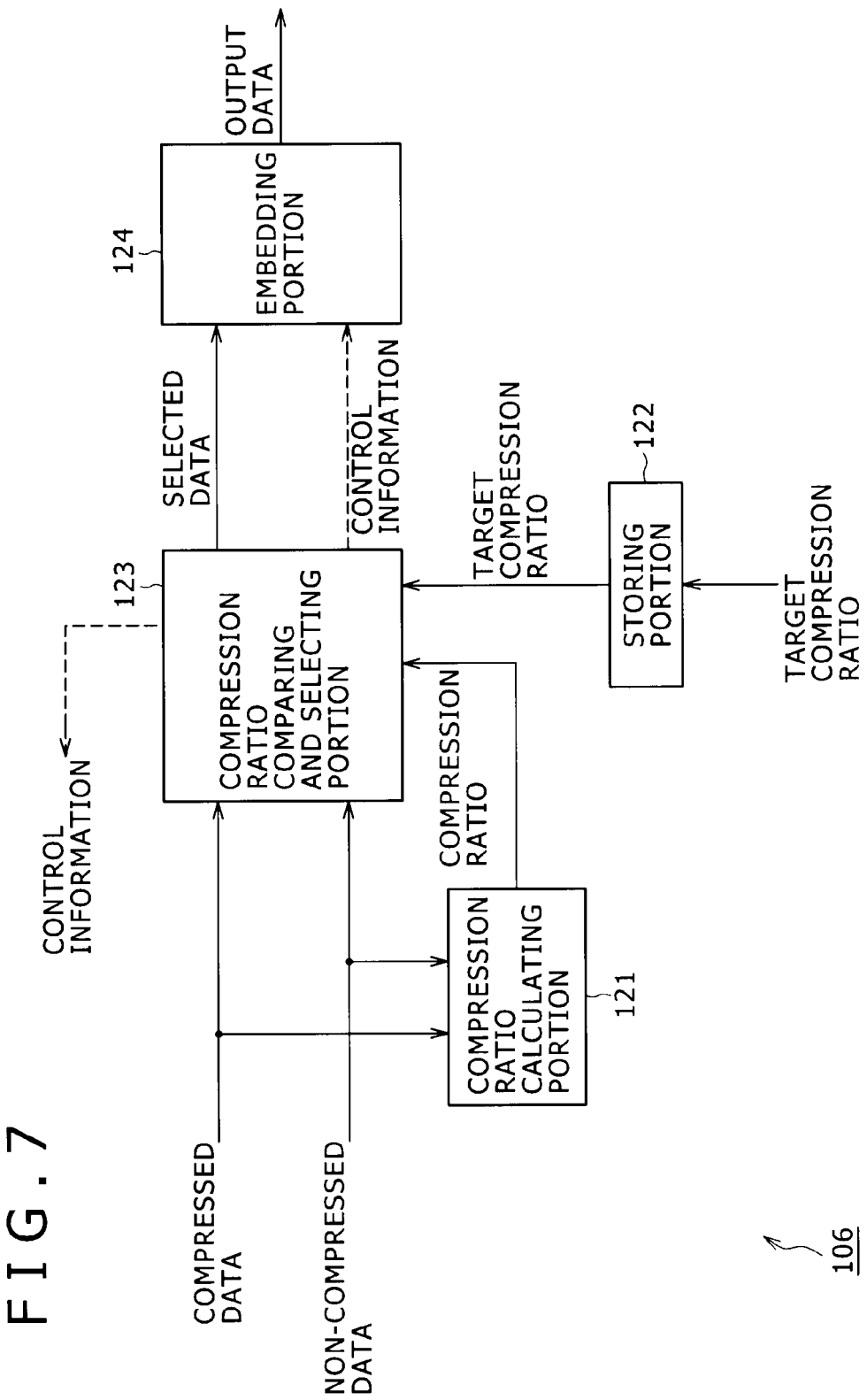

FIG. 8

| VALUES(BITS)<br>MSB          LSB | CODE-BLOCK STYLE |
|---|---|
| xxxx xxx0<br>xxxx xxx1 | NO SELECTIVE ARITHMETIC CODING BYPASS<br>SELECTIVE ARITHMETIC CODING BYPASS |
| xxxx xx0x<br>xxxx xx1x | NO RESET OF CONTEXT PROBABILITIES ON CODING PASS BOUNDARIES<br>RESET OF CONTEXT PROBABILITIES ON CODING PASS BOUNDARIES |
| xxxx x0xx<br>xxxx x1xx | NO TERMINATION ON EACH CODING PASS<br>TERMINATION ON EACH CODING PASS |
| xxxx 0xxx<br>xxxx 1xxx | NO VERTICALLY CAUSAL CONTEXT<br>VERTICALLY CAUSAL CONTEXT |
| xxx0 xxxx<br>xxx1 xxxx | NO PREDICTABLE TERMINATION<br>PREDICTABLE TERMINATION |
| xx0x xxxx<br>xx1x xxxx | NO SEGMENTATION SYMBOLS ARE USED<br>SEGMENTATION SYMBOLS ARE USED |
| 00xx xxxx~<br>11xx xxxx | HOW MANY NUMBER OF BITPLANES FROM MSB SHALL BE ENCODED (1~4). |

FIG.14

| BITPLANE NUMBER | TYPE OF CODING PASS | CODING OPERATION |
|---|---|---|
| 0 | CP(CLEANUP) | AC(ARITHMETIC CODING) |
| 1 | SP(SIGNIFICANCE PROPAGATION) | AC |
| 1 | MR(MAGNITUDE REFINEMENT) | AC |
| 1 | CP | AC |
| 2 | SP | AC |
| 2 | MR | AC |
| 2 | CP | AC |
| 3 | SP | AC |
| 3 | MR | AC |
| 3 | CP | AC |
| 4 | SP | AC |
| 4 | MR | AC |
| 4 | CP | AC,TERMINATE |
| 5 | SP | RAW |
| 5 | MR | RAW,TERMINATE |
| 5 | CP | AC,TERMINATE |
| ........ | ........ | ........ |
| FINAL | SP | RAW |
| FINAL | MR | RAW,TERMINATE |
| FINAL | CP | AC,TERMINATE |

FIG.15

| BITPLANE NUMBER | TYPE OF CODING PASS | CODING OPERATION |
|---|---|---|
| 0 | CP(CLEANUP) | AC(ARITHMETIC CODING) |
| 1 | SP(SIGNIFICANCE PROPAGATION) | AC |
| 1 | MR(MAGNITUDE REFINEMENT) | AC |
| 1 | CP | AC |
| 2 | SP | AC |
| 2 | MR | AC |
| 2 | CP | AC,TERMINATE |
| 3 | SP | RAW |
| 3 | MR | RAW,TERMINATE |
| 3 | CP | AC,TERMINATE |
| 4 | SP | RAW |
| 4 | MR | RAW,TERMINATE |
| 4 | CP | AC,TERMINATE |
| 5 | SP | RAW |
| 5 | MR | RAW,TERMINATE |
| 5 | CP | AC,TERMINATE |
| ....... | ....... | ....... |
| FINAL | SP | RAW |
| FINAL | MR | RAW,TERMINATE |
| FINAL | CP | AC,TERMINATE |

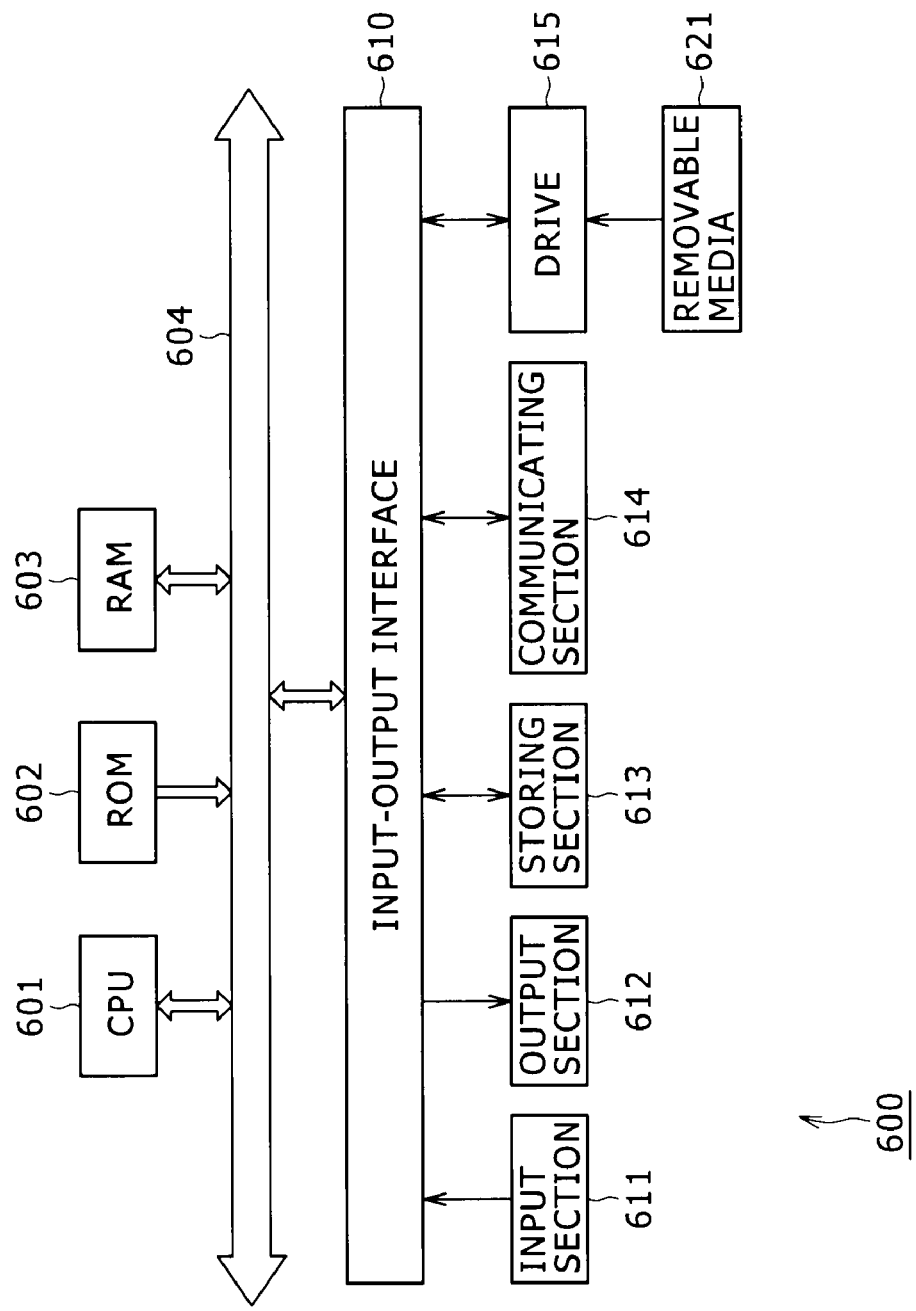

INFORMATION PROCESSING DEVICE AND METHOD

BACKGROUND OF THE INVENTION

1. Field of the Invention

The present invention relates to a device and a method for information processing, and particularly to a device and a method for information processing and a program that can reduce the load of coding or decoding data.

2. Description of the Related Art

An archive system or an image database in the past performs operations of storing and retaining a non-compressed image referred to as a master image, compressing the non-compressed image as required, and distributing a file as a result of the compression via a network or saving the file to recording media, for example.

In film making, a picture is first taken on a 35-mm or 60-mm film, and converted to digital data using a device referred to as a film scan converter. This digitized film source becomes a master image.

Also in a case of medical use, though an image of an X-ray photograph can directly become non-compressed data in some cases, digital data obtained by a film scan as in the above becomes a master image in a case of film.

In addition, many of recent single-lens reflex digital cameras can store RAW data or RGB data obtained from a CCD (Charge Coupled Device) or CMOS (Complementary Metal Oxide Semiconductor) image sensor on a memory card with the RAW data or RGB data remaining in a non-compressed state.

As described above, non-compressed master images are important because of the integrity of data as images, but have a disadvantage of massive data size. Thus, when a master image is to be transferred via a network or when many images are to be recorded on a memory card, some compression (encoding) is unavoidable.

In addition, because the capacity of a hard disk for recording such master images is limited, means is adopted which losslessly compresses master images and stores the losslessly compressed file on a hard disk. At this time, it is convenient to save the master images to a less expensive recording medium such as a tape or the like.

As technology of lossless compression, Zip, LZ77 compression and the like generally used for file compression are well known, but have a problem of being unsuitable for image compression (poor compression ratio) An international standard of JPEG (Joint Photographic Experts Group) has JPEG-LS standardized as a lossless compression, but JPEG-LS is not spread at all in terms of practical use.

Standards for lossless compression further include JPEG2000 (see Japanese Patent No. 3906630, referred to as Patent Document 1 hereinafter, for example). JPEG2000 provides two compression options, that is, lossless compression and lossy compression, and has another excellent advantage of scalability (resolution, image quality, components and the like) and the like. This JPEG2000 is used for the digital cinema, for example, as a lossy compression. A DCI standard (Digital Cinema Initiatives) provides that JPEG2000 Part-1 be used as compression and decompression techniques.

JPEG2000 is also used as lossless compression. For example, JPEG2000 is used for compression when a non-compressed master image is stored temporarily. In addition, utilizing scalability as a feature of JPEG2000, JPEG2000 is also used in a case where a compressed file is first generated by performing lossless compression, and is converted into an irreversible file of the DCI standard or the like as required.

Patent Document 1 describes an image coding device that has both a fixed-point type wavelet transform part and an integer type wavelet transform part, which can perform both a lossy transform and a lossless transform, and which is capable of increasing a degree of freedom of selection of image quality and compression ratio.

SUMMARY OF THE INVENTION

However, the JPEG2000 system as described above may not be practical because of too large a processing amount of lossless compression. For the entropy coding of JPEG2000, a technique referred to as EBCOT (Embedded Block Coding with Optimized Truncation) that combines bit modeling and arithmetic coding is adopted. EBCOT is a basis of high compression performance of JPEG2000, but has a drawback of a very heavy calculation load. In the case of lossless compression of JPEG2000, EBCOT is performed for all bitplanes, and thus the calculation load is further increased. Therefore, when an encoder of the JPEG2000 lossless compression system is to be implemented, this heavy load increases hardware cost to a degree that exceeds an allowable range, so that the implementation may be difficult.

In addition, the increase in processing load may increase the processing time of coding to a degree that exceeds an allowable range. For example, a master image of the DCI standard is a high-resolution image (for example 4 K×2 K), and it takes a few seconds for an ordinary encoder to perform the process of lossless compression of one picture of such a master image by the JPEG2000 lossless compression system. At this rate, it takes a few days in total to code contents for about two hours, for example. Such an increase in processing time may for example increase not only hardware occupancy and processing cost such as electricity charges and the like but also personnel expenses for operators.

Thus, there has been a great desire to establish means for reducing the calculation load of the JPEG2000 lossless compression without sacrificing the compression ratio.

The present invention is to solve such problems. It is desirable to be able to reduce the load of coding or decoding data.

According to a first embodiment of the present invention, there is provided an information processing device including: bitplane expanding means for expanding image data into bitplanes as sets of bits at identical places in each unit of a predetermined number of pieces of data each having a bit depth of a plurality of bits; coding means for coding the image data expanded by the bitplane expanding means in each bitplane in predetermined order; selecting means for, when a compression ratio of compressed data of each bitplane, the compressed data being generated by coding by the coding means, is higher than a target compression ratio, selecting the compressed data as a result of coding of the image data, and when the compression ratio of the compressed data of each bitplane is equal to or lower than the target compression ratio, selecting non-compressed data, the non-compressed data being the image data of each bitplane before being coded by the coding means, as a result of coding of the image data; and selection controlling means for controlling the coding means to stop a coding process and selecting the non-compressed data for a bitplane situated at a position subsequent to a bitplane for which the non-compressed data is selected by the selecting means in the predetermined order.

The coding means can perform the coding by EBCOT (Embedded Block Coding with Optimized Truncation) of JPEG (Joint Photographic Experts Group) 2000.

The predetermined order can be an order from a high-order side to a low-order side of the bit depth.

When a number of bitplanes for which the compressed data is selected as a result of coding of the image data reaches a maximum number, the selecting means can select the non-compressed data as a result of coding of the image data regardless of the compression ratio.

The selecting means can include: compression ratio calculating means for calculating the compression ratio of the compressed data of each bitplane; and comparing and selecting means for comparing the compression ratio calculated by the compression ratio calculating means with the target compression ratio, and selecting the compressed data as a result of coding of the image data when the compression ratio is higher than the target compression ratio, and selecting the non-compressed data as a result of coding of the image data when the compression ratio is equal to or lower than the target compression ratio.

The information processing device can further include: wavelet transform means for transforming the image data into coefficient data of each subband; and determining means for determining magnitude relation between the compression ratio of the compressed data of each bitplane and the target compression ratio; wherein the bitplane expanding means expands each unit of a predetermined number of pieces of the coefficient data obtained by transformation by the wavelet transform means into bitplanes, and the determining means makes determination for the compression ratio using the target compression ratio set independently for each subband.

The information processing device can further include setting means for setting the target compression ratio, wherein the determining means makes determination for the compression ratio using the target compression ratio set by the setting means.

The information processing device can further include adding means for adding information indicating a position at which the selecting means changes selection of the result of coding of the image data from the compressed data to the non-compressed data to the result of coding of the image data.

According to the first embodiment of the present invention, there is also provided an information processing method of an information processing device, the information processing method including the steps of: expanding image data into bitplanes as sets of bits at identical places in each unit of a predetermined number of pieces of data each having a bit depth of a plurality of bits; coding the image data expanded into the bitplanes in each bitplane in predetermined order; when a compression ratio of compressed data of each bitplane, the compressed data being generated by coding, is higher than a target compression ratio, selecting the compressed data as a result of coding of the image data, and when the compression ratio of the compressed data of each bitplane is equal to or lower than the target compression ratio, selecting non-compressed data, the non-compressed data being the image data of each bitplane before being coded, as a result of coding of the image data; and stopping a coding process and selecting the non-compressed data for a bitplane situated at a position subsequent to a bitplane for which the non-compressed data is selected in the predetermined order.

According to a second embodiment of the present invention, there is provided an information processing device including: bitplane expanding means for expanding image data into bitplanes as sets of bits at identical places in each unit of a predetermined number of pieces of data each having a bit depth of a plurality of bits; coding means for coding the image data expanded by the bitplane expanding means in each bitplane in predetermined order; selecting means for selecting, for a predetermined number of bitplanes, compressed data of each bitplane, the compressed data being generated by coding by the coding means, as a result of coding of the image data; and selection controlling means for controlling the coding means to stop a coding process and selecting non-compressed data, the non-compressed data being the image data of each bitplane before being coded by the coding means, as a result of coding of the image data for a bitplane situated at a position subsequent to the predetermined number of bitplanes for which the compressed data is selected by the selecting means in the predetermined order.

The predetermined order can be an order from a high-order side to a low-order side of the bit depth.

The information processing device can further include wavelet transform means for transforming the image data into coefficient data of each subband, wherein the bitplane expanding means expands each unit of a predetermined number of pieces of the coefficient data obtained by transformation by the wavelet transform means into bitplanes, and the selecting means selects the compressed data as a result of coding of the image data for the predetermined number of bitplanes, the predetermined number being set independently for each subband.

The information processing device can further include setting means for setting the predetermined number, wherein the selecting means selects the compressed data as a result of coding of the image data for the predetermined number of bitplanes, the predetermined number being set by the setting means.

The information processing device can further include adding means for adding information indicating a position at which the selecting means changes selection of the result of coding of the image data from the compressed data to the non-compressed data to the result of coding of the image data.

According to the second embodiment of the present invention, there is also provided an information processing method of an information processing device, the information processing method including the steps of: expanding image data into bitplanes as sets of bits at identical places in each unit of a predetermined number of pieces of data each having a bit depth of a plurality of bits; coding the image data expanded into the bitplanes in each bitplane in predetermined order; selecting, for a predetermined number of bitplanes, compressed data of each bitplane, the compressed data being generated by coding, as a result of coding of the image data; and stopping a coding process and selecting non-compressed data, the non-compressed data being the image data of each bitplane before being coded, as a result of coding of the image data for a bitplane situated at a position subsequent to the predetermined number of bitplanes for which the compressed data is selected in the predetermined order.

According to a third embodiment of the present invention, there is provided an information processing device including: decrypting and determining means for decrypting data generated by coding a part or all of image data, and determining whether to decode the data for each predetermined data unit; and decoding means for decoding a part or all of the data on a basis of a result of determination by the decrypting and determining means.

The decrypting and determining means can decrypt the data, count a number of pieces of the data as processed predetermined data units, and determine that the data is to be decoded until a count value exceeds a predetermined number, and determine that the data is not to be decoded when the count value has exceeded the predetermined number.

The decrypting and determining means can decrypt the data, obtain control information indicating whether the data of a predetermined data unit is compressed data, the control information being included in the data, and determine whether to decode the data on a basis of the control information.

The information processing device can further include wavelet inverse transform means for subjecting the data decoded by the decoding means and the data not decoded by the decoding means to a wavelet inverse transform.

According to the third embodiment of the present invention, there is also provided an information processing method of an information processing device, the information processing method including the steps of: decrypting data generated by coding a part or all of image data, and determining whether to decode the data for each predetermined data unit; and decoding a part or all of the data on a basis of a result of determination.

In the first embodiment of the present invention, image data is expanded into bitplanes as sets of bits at identical places in each unit of a predetermined number of pieces of data each having a bit depth of a plurality of bits, the image data expanded into the bitplanes is coded in each bitplane in predetermined order, when a compression ratio of compressed data of each bitplane, the compressed data being generated by coding, is higher than a target compression ratio, the compressed data is selected as a result of coding of the image data, and when the compression ratio of the compressed data of each bitplane is equal to or lower than the target compression ratio, non-compressed data, which is the image data of each bitplane before being coded, is selected as a result of coding of the image data, and a coding process is stopped and the non-compressed data is selected for a bitplane situated at a position subsequent to a bitplane for which the non-compressed data is selected in the predetermined order.

In the second embodiment of the present invention, image data is expanded into bitplanes as sets of bits at identical places in each unit of a predetermined number of pieces of data each having a bit depth of a plurality of bits, the image data expanded into the bitplanes is coded in each bitplane in predetermined order, for a predetermined number of bitplanes, compressed data of each bitplane, the compressed data being generated by coding, is selected as a result of coding of the image data, and a coding process is stopped and non-compressed data, which is the image data of each bitplane before being coded, is selected as a result of coding of the image data for a bitplane situated at a position subsequent to the predetermined number of bitplanes for which the compressed data is selected in the predetermined order.

In the third embodiment of the present invention, data generated by coding a part or all of image data is decrypted, whether to decode the data is determined for each predetermined data unit, and a part or all of the data is decoded on a basis of a result of determination.

According to the present embodiments, it is possible to code or decode data. In particular, it is possible to reduce the processing amount of coding or decoding of data, and reduce processing time.

BRIEF DESCRIPTION OF THE DRAWINGS

FIG. 6 is a diagram of assistance in explaining an example of scanning of coefficients;

FIG. 7 is a block diagram showing an example of detailed configuration of a selecting section;

FIG. 8 is a diagram of assistance in explaining an example of configuration of an SPcoc or SPcod parameter;

FIG. 14 is a diagram of assistance in explaining an example of coding operation;

FIG. 15 is a diagram of assistance in explaining another example of coding operation;

FIG. 23 is a block diagram showing an example of configuration of a personal computer to which the present invention is applied.

DETAILED DESCRIPTION OF THE PREFERRED EMBODIMENTS

The best mode for carrying out the invention (hereinafter referred to as an embodiment) will hereinafter be described. Incidentally, description will be made in the following order.
1. First Embodiment (coding process: an example of making compression and non-compression selection on the basis of a compression ratio)
2. Second Embodiment (coding process: an example of making compression and non-compression selection on the basis of a fixed number)
3. Third Embodiment (coding process: an example of making compression and non-compression selection on the basis of a compression ratio and a fixed number)
4. Fourth Embodiment (coding process: an example of controlling a criterion for compression and non-compression selection)
5. Fifth Embodiment (decoding process: an example of decoding a code stream resulting from compression and non-compression selection)

1. First Embodiment

[Example of Configuration of Encoder]

Figure 1:
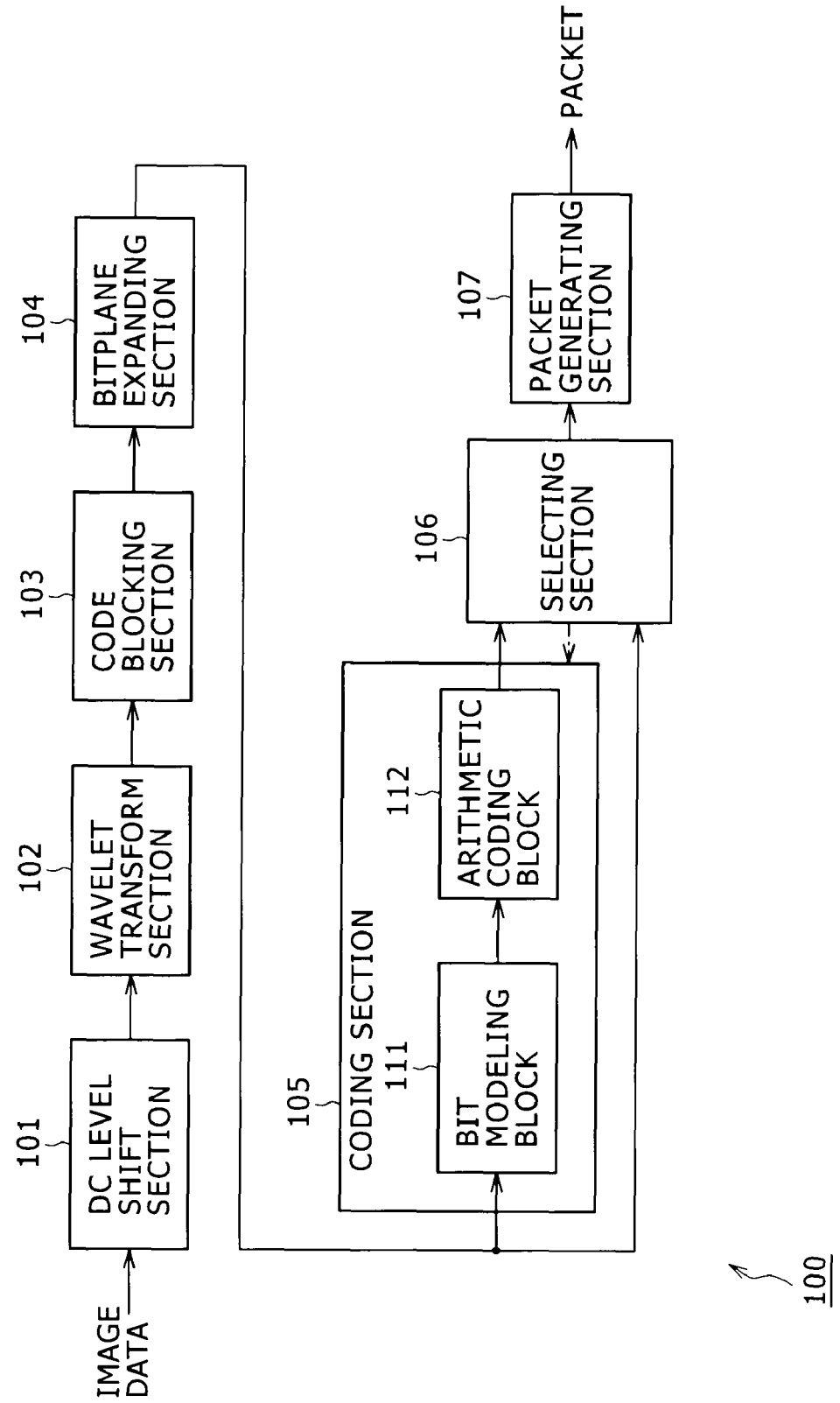
FIG. 1 is a block diagram showing an example of a main configuration of an encoder to which the present invention is applied.

FIG. 1 is a block diagram showing an example of configuration of an encoder to which the present invention is applied. Description will be made referring to FIGS. 2 to 6 as required. An encoder 100 shown in FIG. 1 is an encoding device that encodes and compresses image data by a JPEG (Joint Photographic Experts Group) 2000 system. The encoder 100 performs lossless compression of image data. Of course, the encoder 100 may perform lossy compression.

The encoder 100 subjects image data to a wavelet transform, expands resulting coefficients into a bitplane for each code block, and performs entropy coding for each bitplane.

JPEG2000 bitplanes on a least significant bit side tend to have more random noise, and are decreased in compression ratio (advantage) of compression by entropy coding. On the other hand, an amount of processing (disadvantage) of entropy coding does not vary greatly regardless of the bitplane being processed. That is, as the bitplane being processed becomes closer to the least significant bit side, the advantage obtained by entropy coding is decreased with respect to the disadvantage.

Accordingly, the encoder 100 performs entropy coding in order from a bitplane on a most significant bit (MSB) side, and ends the entropy coding in an intermediate bitplane. That is, the encoder 100 performs entropy coding of a part of bitplanes on the most significant bit side, and outputs remaining bitplanes on the least significant bit side without coding the remaining bitplanes.

In other words, the encoder 100 performs entropy coding of bitplanes on the most significant bit side where a great effect is obtained, and omits the process of coding bitplanes on the least significant bit side where a little effect is obtained. The encoder 100 can reduce the amount of processing by this omission of the coding process. In addition, because the process of coding bitplanes on the least significant bit side where the compression ratio is low is omitted, an effect on compression efficiency can be made small.

As shown in FIG. 1, the encoder 100 includes a DC level shift section 101, a wavelet transform section 102, a code blocking section 103, a bitplane expanding section 104, a coding section 105, a selecting section 106, and a packet generating section 107.

The DC level shift section 101 shifts the level of a DC component of image data for an efficient wavelet transform in a subsequent stage. For example, an RGB signal has a positive value (an integer without a sign). Accordingly, utilizing this, the DC level shift section 101 performs a level shift that halves the dynamic range of the original signal to improve compression efficiency. Thus, this level shift is not performed when the original signal is a signal having an integral value with a sign (both a positive sign and a negative sign) such as a Cb or Cr signal (color-difference signal) of a YCbCr signal or the like.

The wavelet transform section 102 is generally realized by a filter bank composed of a low-frequency filter and a high-frequency filter. In addition, because a digital filter generally has an impulse response (filter coefficient) of a length of a plurality of taps, the wavelet transform section 102 has a buffer for buffering a sufficient input image for filtering in advance.

The wavelet transform section 102 obtains image data output from the DC level shift section 101 by a minimum necessary data amount for filtering or more. The wavelet transform section 102 filters the image data after the DC level shift using a 5×3 wavelet transform filter to generate wavelet coefficients. Incidentally, the wavelet transform section 102 performs filtering that separates the image data into a low-frequency component and a high-frequency component in each of the vertical direction and the horizontal direction of the image.

Figure 2:
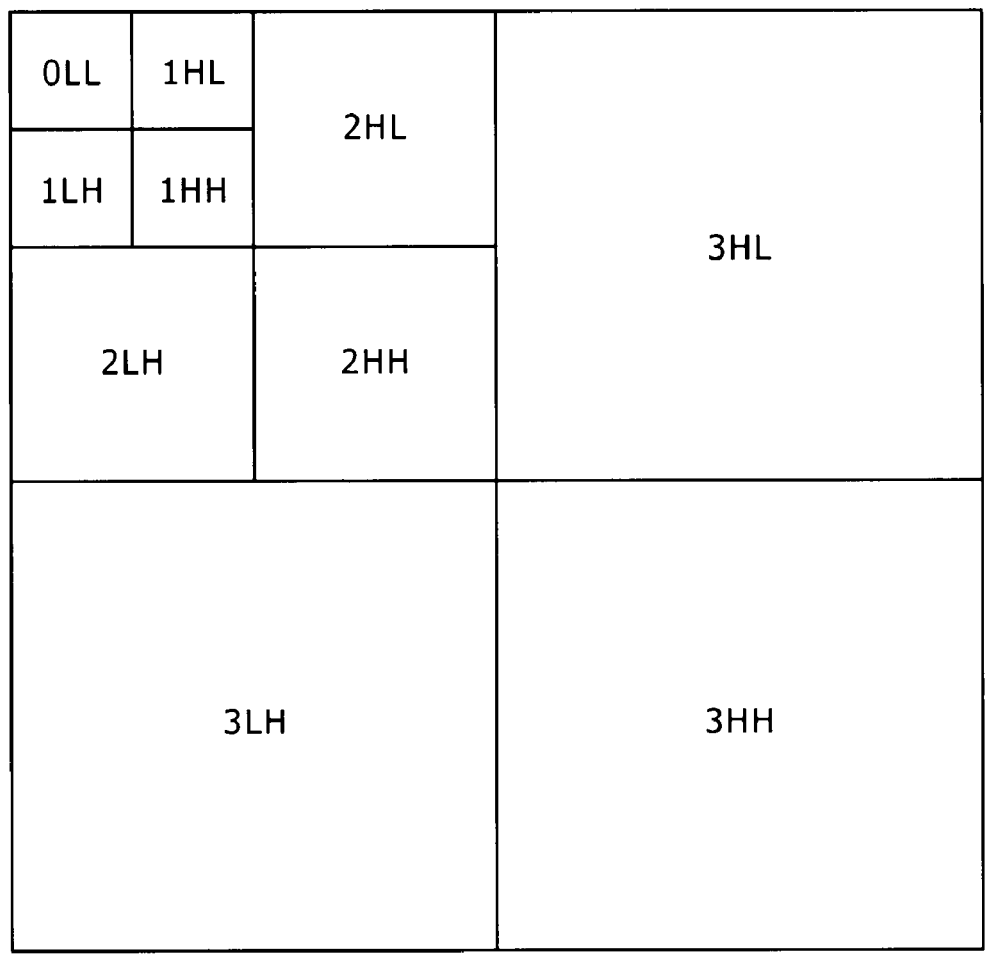
FIG. 2 is a diagram showing an example of configuration of subbands.

Then, the wavelet transform section 102 recursively repeats such filtering processing on a subband separated as a low-frequency component in both the vertical direction and the horizontal direction a predetermined number of times, as shown in FIG. 2. This is because most of image energy concentrates in a low-frequency component.

FIG. 2 is a diagram showing an example of configuration of subbands generated by a wavelet transform process with a division level number 3. In this case, the wavelet transform section 102 first filters the entire image to generate subbands 3LL (not shown), 3HL, 3LH, and 3HH. Next, the wavelet transform section 102 again filters the generated subband 3LL to generate subbands 2LL (not shown), 2HL, 2LH, and 2HH. Further, the wavelet transform section 102 again filters the generated subband 2LL to generate subbands 0LL, 1HL, 1LH, and 1HH.

The wavelet transform section 102 supplies the code blocking section 103 with wavelet coefficients obtained by the filtering for each subband. Incidentally, the JPEG2000 standard omits a quantization process in the case of lossless compression. In other words, when the encoder 100 performs lossy compression, it suffices to provide a quantizing section, quantize the wavelet coefficients obtained in the wavelet transform section 102 in the quantizing section, and supply resulting quantized coefficients to the code blocking section 103.

Figure 3:
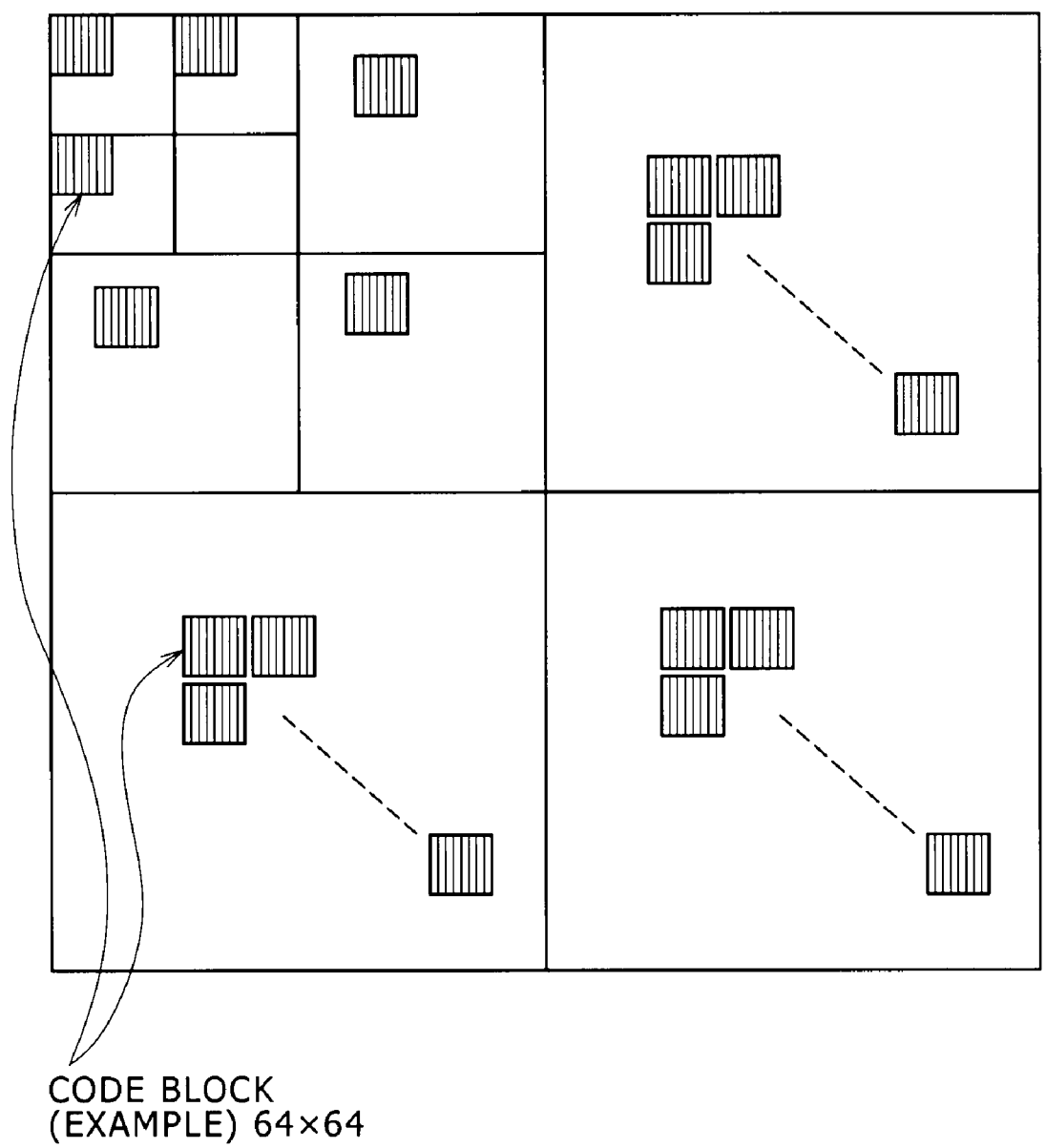
FIG. 3 is a diagram showing an example of code blocks in respective subbands.

The code blocking section 103 divides the wavelet coefficients of each subband into code blocks of a predetermined size, which code blocks are processing units of entropy coding. FIG. 3 shows the positional relation of code blocks in each subband. Code blocks of a size of about 64×64 pixels, for example, are generated in all the subbands after the division. In the example of FIG. 2, supposing that the subband 3HH at the lowest division level has a size of 640×320 pixels, for example, the subband 3HH includes a total of 50 code blocks of 64×64 pixels. Each processing section in the following stages performs processing in each of the code blocks. Of course, the size (number of pixels) of the code block is arbitrary.

The code blocking section 103 supplies each code block to the bitplane expanding section 104. The bitplane expanding section 104 expands the coefficient data of each code block into a bitplane at each bit position. The bitplane expanding section 104 supplies the bitplane to the coding section 105.

The bitplane is obtained by dividing (slicing) a coefficient group (for example a code block) of a predetermined number of wavelet coefficients at each bit, that is, each place. That is, the bitplane is a set of bits (coefficient bits) at a same place of a plurality of pieces of data each having a bit depth of a plurality of bits.

Figure 4:
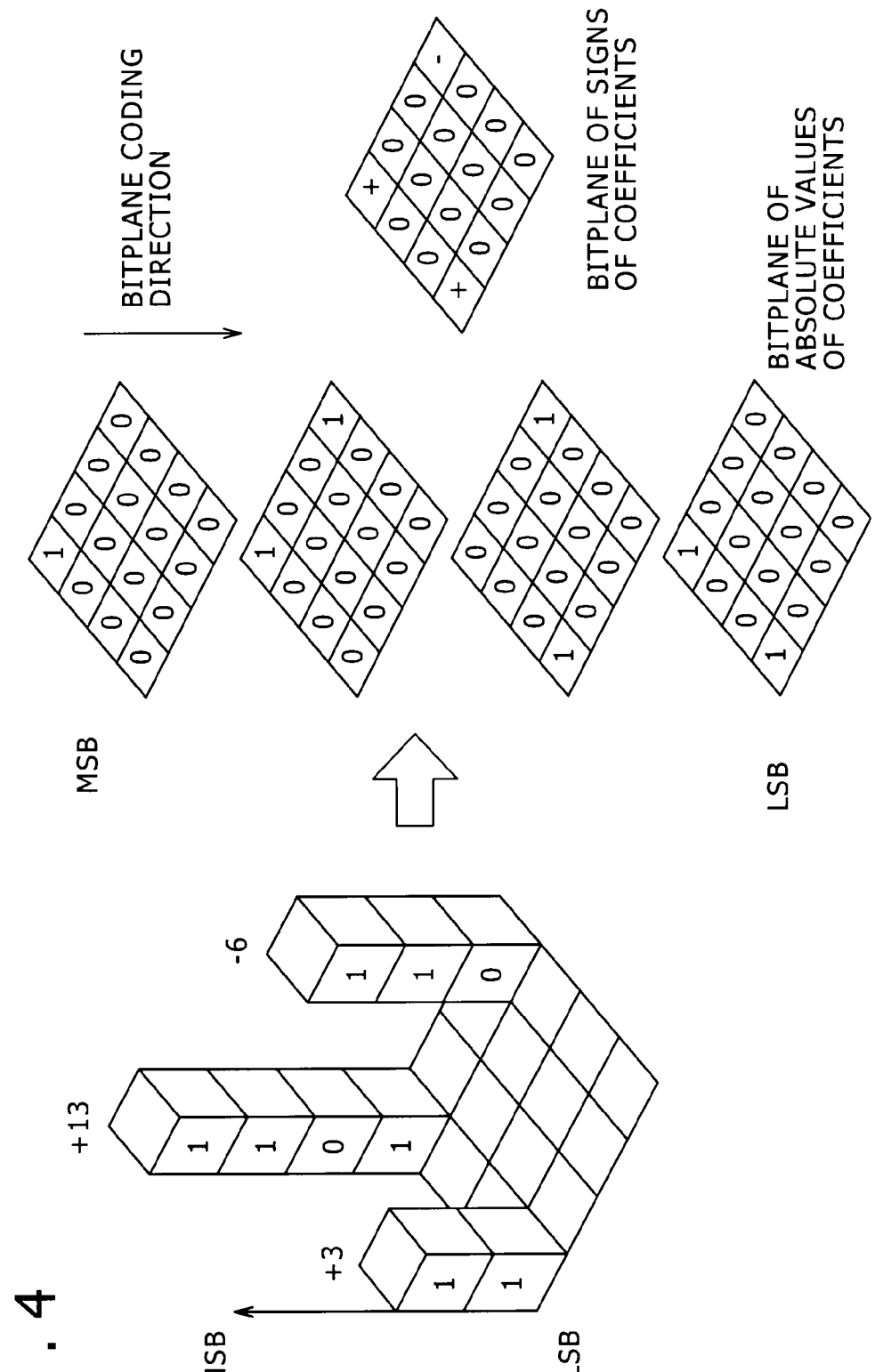
FIG. 4 is a diagram of assistance in explaining an example of bitplanes.

FIG. 4 shows a concrete example of the bitplane. A left diagram of FIG. 4 shows a total of 16 coefficients with four coefficients in a vertical direction and four coefficients in a horizontal direction. Of the 16 coefficients, a coefficient has a maximum absolute value of 13, which is represented as 1101 in a binary notation. The bitplane expanding section 104 expands such a coefficient group into four bitplanes showing absolute values (bitplanes of absolute values) and one bitplane showing signs (a bitplane of signs). That is, the coefficient group on the left of FIG. 4 is expanded into the four absolute value bitplanes and the one sign bitplane, as shown on a right of FIG. 4. All elements of the absolute value bitplanes assume a value of 0 or 1. An element of the bitplane showing signs assumes one of a value indicating that the value of the coefficient is a positive value, a value indicating that the value of the coefficient is 0, and a value indicating that the value of the coefficient is a negative value.

Incidentally, the number of coefficients of the coefficient group thus converted into bitplanes is arbitrary. Description in the following will be made supposing that the bitplane expanding section 104 expands coefficients in each code block into bitplanes in order to facilitate processing in each section by unifying processing units.

The bitplane expanding section 104 supplies the coding section 105 with the thus expanded bitplanes in order from a most significant bit (MSB) of the coefficients to a least significant bit (LSB). That is, the bitplane expanding section 104 supplies the coding section 105 with the expanded bitplanes in order from a higher level side to a lower level side of the bit depth.

The coding section 105 performs entropy coding referred to as EBCOT (Embedded Coding with Optimized Truncation) defined in the JPEG2000 standard on the input coefficient data (bitplane). EBCOT is a method for performing coding for each block of a predetermined size while measuring statistics of coefficients within the block.

As shown in FIG. 1, the coding section 105 includes a bit modeling block 111 and an arithmetic coding block 112. The bit modeling block 111 performs bit modeling on the coefficient data according to a procedure defined in the JPEG2000 standard, and sends a context to the arithmetic coding block 112. The arithmetic coding block 112 performs arithmetic coding of the bitplane of the coefficients.

The vertical and horizontal sizes of code blocks are powers of two from four to 256, and sizes generally used include 32×32, 64×64, 128×32 and the like. Suppose that a coefficient value is represented by an n-bit binary number with a sign, and that bits zero to (n−2) represent each of the bits from the LSB to the MSB. The remaining bit indicates the sign. A code block is coded by the following three kinds of coding passes in order from a bitplane on an MSB side.

(1) Significant Propagation Pass

In Significant Propagation Pass for coding a certain bitplane, the values in the bitplane of non-significant coefficients such that at least one of eight adjacent coefficients is significant are subjected to arithmetic coding. When a coded value of the bitplane is one, information indicating whether a sign is a positive sign or a negative sign is next subjected to arithmetic coding.

The word "significance" will be described. The significance changes to one indicating "significant" when each coefficient is coded, and thereafter continues to be one at all times. Therefore the significance can also be said to be a flag indicating whether the information of a significant digit has already been coded. When a coefficient becomes significant in a certain bitplane, the coefficient remains significant in subsequent bitplanes.

(2) Magnitude Refinement Pass

In Magnitude Refinement Pass for coding the bitplane, the values in the bitplane of significant coefficients not coded by Significance Propagation Pass for coding the bitplane are subjected to arithmetic coding.

(3) Cleanup Pass

In Cleanup Pass for coding the bitplane, the values in the bitplane of non-significant coefficients not coded by Significance Pass for coding the bitplane are subjected to arithmetic coding. When a coded value of the bitplane is one, information indicating whether a sign is a positive sign or a negative sign is next subjected to arithmetic coding.

Incidentally, in arithmetic coding in the three passes above, methods such as (1) ZC (Zero Coding), (2) RLL (Run-Length Coding), (3) SC (Sign Coding), (4) MR (Magnitude Refinement) and the like are used properly on a case-by-case basis. Incidentally, suppose that an arithmetic code referred to as MQ coding is used in this case. MQ coding is a learning type binary arithmetic code defined in JBIG2. JPEG2000 has a total of 19 kinds of contexts in all coding passes.

Figure 5:
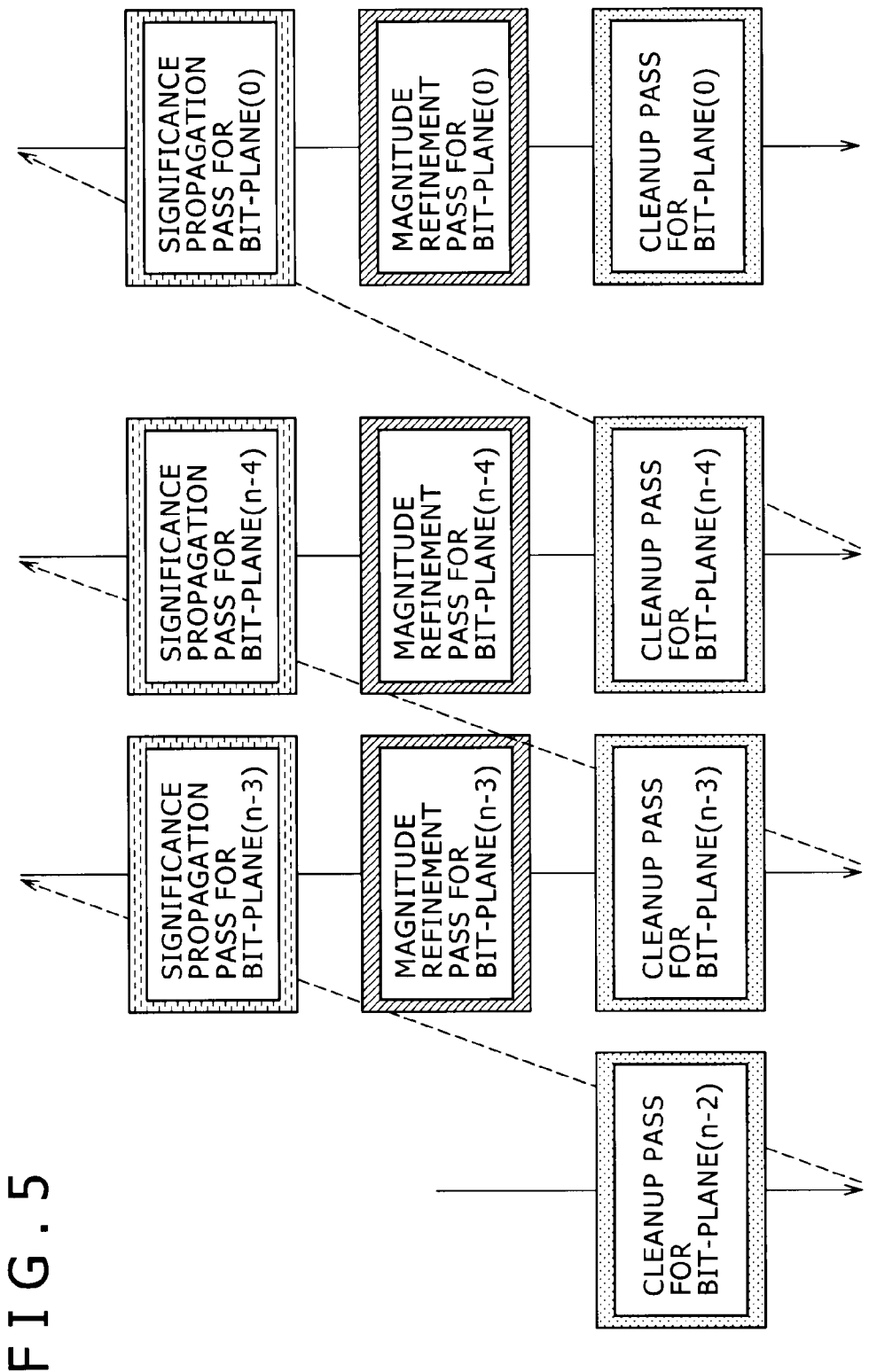
FIG. 5 is a diagram of assistance in explaining an example of coding passes.

An example of order in which these three coding passes are used is shown in FIG. 5. First, a bitplane (n−2) {Bitplane (n−2)}, which is the bitplane of the most significant bit (MSB), is coded by Cleanup Pass. Then, each bitplane is coded in order one by one toward an LSB side with the three coding passes described above used in order of Significant Propagation Pass, Magnitude Refinement Pass, and Cleanup Pass.

In practice, however, the coding section 105 writes in what number bitplane from the MSB side one first appears in a header, and does not code bitplanes whose coefficients are all zero and which continue from the MSB (which bitplanes will be referred to as zero bitplanes).

The scanning of coefficients will next be described with reference to FIG. 6. A code block is divided into stripes each having a height of four coefficients. The width of the stripes is equal to the width of the code block. A scan order is an order in which all coefficients within one code block are traced, and is an order from an upper stripe to a lower stripe in the code block, an order from a left column to a right column in a stripe, and an order from a top to a bottom in a column. All the coefficients in the code block are processed in this scan order in each coding pass.

The coding section 105 performs entropy coding on each bitplane until the coding section 105 is controlled so as not to perform the coding by the selecting section 106. The arithmetic coding block 112 in the coding section 105 supplies a generated code stream (bitplane after the coding) to the selecting section 106. The selecting section 106 is also supplied with the coefficient data before being coded by the coding section 105 (bitplane before the coding).

The selecting section 106 selects one of these pieces of data supplied to the selecting section 106 (the data before the coding and the data after the coding) as a result of coding of the image data according to a predetermined condition. Bitplanes before the coding and after the coding are supplied to the selecting section 106 in order from the MSB side to the LSB side. That is, the selecting section 106 selects each bitplane in order from the MSB side to the LSB side.

In an initial state, the selecting section 106 selects a bitplane after the coding. The selecting section 106 determines whether a predetermined condition is satisfied each time the selecting section 106 makes the selection. When the predetermined condition is satisfied, the selecting section 106 selects a bitplane before the coding. For places lower than the bitplane, the selecting section 106 selects bitplanes before the coding.

That is, the selecting section 106 selects bitplanes after the coding (compressed data) for places higher than a place at which the predetermined condition is satisfied, and selects bitplanes before the coding (non-compressed data) as a result of the coding for the place where the predetermined condition is satisfied and places lower than the place where the predetermined condition is satisfied.

As described above, from characteristics of JPEG2000 bitplanes, a bitplane closer to the MSB has a greater effect on image quality, and offers higher compression efficiency. On the other hand, a bitplane closer to the LSB tends to have more random noise, and the compression ratio of the bitplane is naturally degraded. Accordingly, the encoder 100 omits the coding process for low-order bitplanes offering low compression efficiency, and instead outputs bitplanes before the coding. In order to realize such an operation, the selecting section 106 selects data to be output.

Incidentally, this processing order is arbitrary, and does not necessarily need to be the order from the MSB side to the LSB side. However, the tendency of compression efficiency as described above can be utilized by setting the order from the MSB side to the LSB side.

Incidentally, the selecting section 106 not only simply selects data, but also supplies control information to the coding section 105 as shown by a dotted line arrow in FIG. 1 to stop the coding process when the predetermined condition is satisfied. That is, the process of entropy coding by the coding section 105 is omitted at places lower than the place where the predetermined condition is satisfied. The load of the coding process is reduced by the omission of the coding process.

Of course, the selecting section 106 may make the above-described determination again for low-order bitplanes after selection of non-compressed data. However, an amount of processing is correspondingly increased because not only the determination process but also the coding process is necessary. To begin with, as described above, from characteristics of JPEG2000 bitplanes, dramatic improvement in compression ratio in low-order bitplanes may not be expected in general. Thus, unless there are special circumstances, it is desirable to select non-compressed data and omit the process of entropy coding by the coding section 105 in places lower than the place where the predetermined condition is satisfied.

The selecting section 106 supplies the selected data to the packet generating section 107. The packet generating section 107 generates header information for the supplied data (code stream), and packetizes the data using the header information.

[Example of Configuration of Selecting Section]

FIG. 7 is a block diagram showing an example of configuration of the selecting section 106 in FIG. 1. In the example of FIG. 7, the selecting section 106 determines the compression ratio of entropy coding by the coding section 105 for each bitplane. When the compression ratio is higher than a target compression ratio, the selecting section 106 selects compressed data resulting from the coding by the coding section 105 as a result of the coding of image data. When the compression ratio is lower than the target compression ratio, the selecting section 106 selects non-compressed data before the coding as a result of the coding of the image data. Then, for bitplanes at lower places, the selecting section 106 controls the coding section 105 to stop the coding process, and selects non-compressed bitplanes.

In order to perform such processes, the selecting section 106 includes a compression ratio calculating portion 121, a storing portion 122, a compression ratio comparing and selecting portion 123, and an embedding portion 124.

The compression ratio calculating portion 121 calculates the compression ratio of a bitplane after the coding (compressed data) by comparing the bitplane after the coding (compressed data) which bitplane is supplied from the coding section 105 with a bitplane before the coding (non-compressed data) which bitplane is supplied from the bitplane expanding section 104. More specifically, the compression ratio calculating portion 121 calculates the ratio of the bitplane after the coding (compressed data) to the bitplane before the coding (non-compressed data) as the compression ratio. The compression ratio calculating portion 121 supplies the calculated compression ratio to the compression ratio comparing and selecting portion 123.

The storing portion 122 is for example a storage area formed by a RAM, a flash memory or the like. The storing portion 122 for example stores the target compression ratio of bitplanes, which target compression ratio is input in advance at a time of shipment from a factory, a time of a start of the coding process, or the like. The storing portion 122 supplies the target compression ratio to the compression ratio comparing and selecting portion 123 in predetermined timing. Incidentally, the storing portion 122 may be formed by a ROM in which the target compression ratio is stored in advance. In addition, the storing portion 122 may be included in the compression ratio comparing and selecting portion 123. Further, for example a user, another processing section or the like may input the target compression ratio each time the compression ratio comparing and selecting portion 123 needs the target compression ratio. In this case the storing portion 122 may be omitted.

The compression ratio comparing and selecting portion 123 makes magnitude determination by comparing the compression ratio calculated by the compression ratio calculating portion 121 with the target compression ratio, and selects data on the basis of a result of the determination.

For example, when the compression ratio of a bitplane is lower than the target compression ratio, the compression ratio comparing and selecting portion 123 selects non-compressed data supplied from the bitplane expanding section 104. In this case, the compression ratio comparing and selecting portion 123 supplies control information to the coding section 105 so as not to perform the process of coding bitplanes at lower places of the code block. Then, the compression ratio comparing and selecting portion 123 selects non-compressed data for all of the lower places of the code block.

For example, when the compression ratio of a result of compression exceeds the target compression ratio, the compression ratio comparing and selecting portion 123 selects the data after the compression which data is supplied from the coding section 105. In this case, the compression ratio comparing and selecting portion 123 similarly makes compression ratio magnitude determination for a next bitplane (bitplane lower by one place).

Letting A be the calculated compression ratio, and N be the target compression ratio, the above control can be expressed as follows.

---

If (A < N) (lower than the target) then
   {send the bitplane in a state of remaining non-compressed}
   Else (exceeding the target)
      {send a result of EBCOT for the bitplane}

---

The compression ratio comparing and selecting portion 123 supplies the thus selected bitplane (selected data) to the embedding portion 124. The compression ratio comparing and selecting portion 123 further supplies the embedding portion 124 with information on the data selection as control information.

The embedding portion 124 embeds predetermined information in a predetermined position of the selected data supplied from the compression ratio comparing and selecting portion 123, and thereby generates output data. For example, the embedding portion 124 multiplexes the control information supplied from the compression ratio comparing and selecting portion 123 in unassigned bits of an SPcod or SPcoc parameter within a COD (Coding style default) parameter (from an ISO (International Organization for Standardization) 154441 JPEG2000 Part-1 standard) as a part for describing information such as a coding condition or the like. That is, the embedding portion 124 adds the control information to a code stream as a result of coding of image data.

This control information includes for example information indicating a place where selection is changed from compressed data to non-compressed data, such as the number of bitplanes for an end of EBCOT coding or the like. Of course, the control information may include other information.

FIG. 8 is a diagram of assistance in explaining this embodiment. A table shown in FIG. 8 is of assistance in explaining a configuration of eight bits given as an SPcod or SPcoc parameter. As shown in this table, various information is assigned to each of six low-order bits of the SPcod or SPcoc parameter, whereas two high-order bits from the MSB of these eight bits are Reserved, that is, unassigned bits in the JPEG2000 standard. The embedding portion 124 for example specifies the number of bitplanes for ending the EBCOT coding using the two bits.

Incidentally, a position at which such control information is embedded is arbitrary as long as the position can be identified by a decoder that decodes the code stream. This embedding position may be determined in advance, or information indicating the embedding position may be provided separately. In addition, the information amount of the control information is also arbitrary.

The embedding portion 124 supplies generated output data (code stream) to the packet generating section 107. Because the control information is thus embedded in the code stream by the embedding portion 124, the decoder that decodes the code stream extracts the control information from the code stream, and can properly decode the code stream on the basis of the control information. For example, the decoder can identify the number of bitplanes for ending the EBCOT coding from the code stream without requiring other information. Thereby the constitution and processing of the decoder can be simplified.

Incidentally, this control information may be provided to the decoder separately from the code stream. In this case, the embedding portion 124 can be omitted, and the processing of the encoder 100 is correspondingly simplified. However, an arrangement has to be made with the decoder in relation to the sending and receiving of the control information. In addition, the decoder has to be able to use the control information provided separately for a decoding process.

[Description of Operation]

An example of a flow of a coding process by the encoder 100 will next be described with reference to a flowchart of FIG. 9. The encoder 100 for coding moving image data performs the coding process to be described below for each frame of a moving image.

When the coding process is started, the DC level shift section 101 in step S101 shifts the DC level of input image data. In step S102, the wavelet transform section 102 subjects the image data to a wavelet transform. In step S103, the code blocking section 103 divides wavelet coefficients into code block units. In step S104, the bitplane expanding section 104 expands the coefficient data of each code block into bitplanes. In step S105, the selecting section 106 sets a bitplane as processing object, and determines whether non-compressed data was selected last time (in selection of a bitplane higher by one place). When the selecting section 106 determines that non-compressed data was not selected, the selecting section 106 advances the process to step S106.

In step S106, the coding section 105 performs entropy coding of the bitplane as processing object. In step S107, the selecting section 106 performs a selecting process to select one of non-compressed data (bitplane before the coding) and compressed data (bitplane after the coding). The selecting section 106 then advances the process to step S109. Details of the selecting process will be described later.

When the selecting section 106 determines that non-compressed data was selected last time, the process proceeds to step S108. In step S108, the selecting section 106 selects non-compressed data. The selecting section 106 advances the process to step S109 without the coding process being performed.

In step S109, the selecting section 106 generates a code stream using the selected data. In step S110, the selecting section 106 determines whether all bitplanes have been processed. When the selecting section 106 determines that not all the bitplanes have been processed, the selecting section 106 advances the process to step S111, where the selecting section 106 changes the processing object to a next bitplane. After the process of step S111 is ended, the process returns to step S105 to repeat the process from step S105 on down.

When it is determined in step S110 that all the bitplanes have been processed after the process of steps S105 to S111 is performed repeatedly, the process proceeds to step S112. In step S112, the embedding portion 124 in the selecting section 106 embeds control information such as information indicating a bitplane selection changing position, for example, in the code stream.

In step S113, the selecting section 106 determines whether all code blocks have been processed. When the selecting section 106 determines that not all the code blocks have been processed, the selecting section 106 advances the process to step S114, where the selecting section 106 changes the processing object to a highest-order bitplane among bitplanes of a next code block excluding zero bitplanes. After the process of step S114 is ended, the process returns to step S104 to repeat the process from step S104 on down.

When it is determined in step S113 that all the code blocks have been processed after the process of steps S104 to S114 is performed repeatedly, the coding process is ended.

By thus omitting the entropy coding process for a part of bitplanes, the encoder 100 can reduce the load of the coding process. In addition, by omitting the entropy coding in low-order bitplanes, the encoder 100 can suppress an increase in effect of the omission of the coding process, and shorten a processing time without greatly decreasing the compression efficiency of the coding process.

An example of a detailed flow of the selecting process performed in step S107 in FIG. 9 will next be described with reference to a flowchart of FIG. 10.

When the selecting process is started, the compression ratio calculating portion 121 in Step S131 calculates the compression ratio of the compressed data. In Step S132, the compression ratio comparing and selecting portion 123 determines whether the compression ratio is higher than the target compression ratio. When the compression ratio comparing and selecting portion 123 determines that the compression ratio is higher than the target compression ratio, the compression ratio comparing and selecting portion 123 advances the process to step S133 to select the compressed data. The compression ratio comparing and selecting portion 123 then ends the selecting process. In this case, this selecting process is performed also for a next (lower-order) bitplane.

When the compression ratio comparing and selecting portion 123 in Step S132 determines that the compression ratio is higher than the target compression ratio, the compression ratio comparing and selecting portion 123 advances the process to Step S134 to select the non-compressed data. The compression ratio comparing and selecting portion 123 then ends the selecting process. In this case, this selecting process is omitted (the process of Step S108 is performed) for a next (lower-order) bitplane.

By thus selecting a bitplane on the basis of the compression ratio, the selecting section 106 can reduce the processing time of coding while performing the coding so as not to decrease the compression ratio greatly from a target value.

[Example of Result of Encoding]

Figure 11:
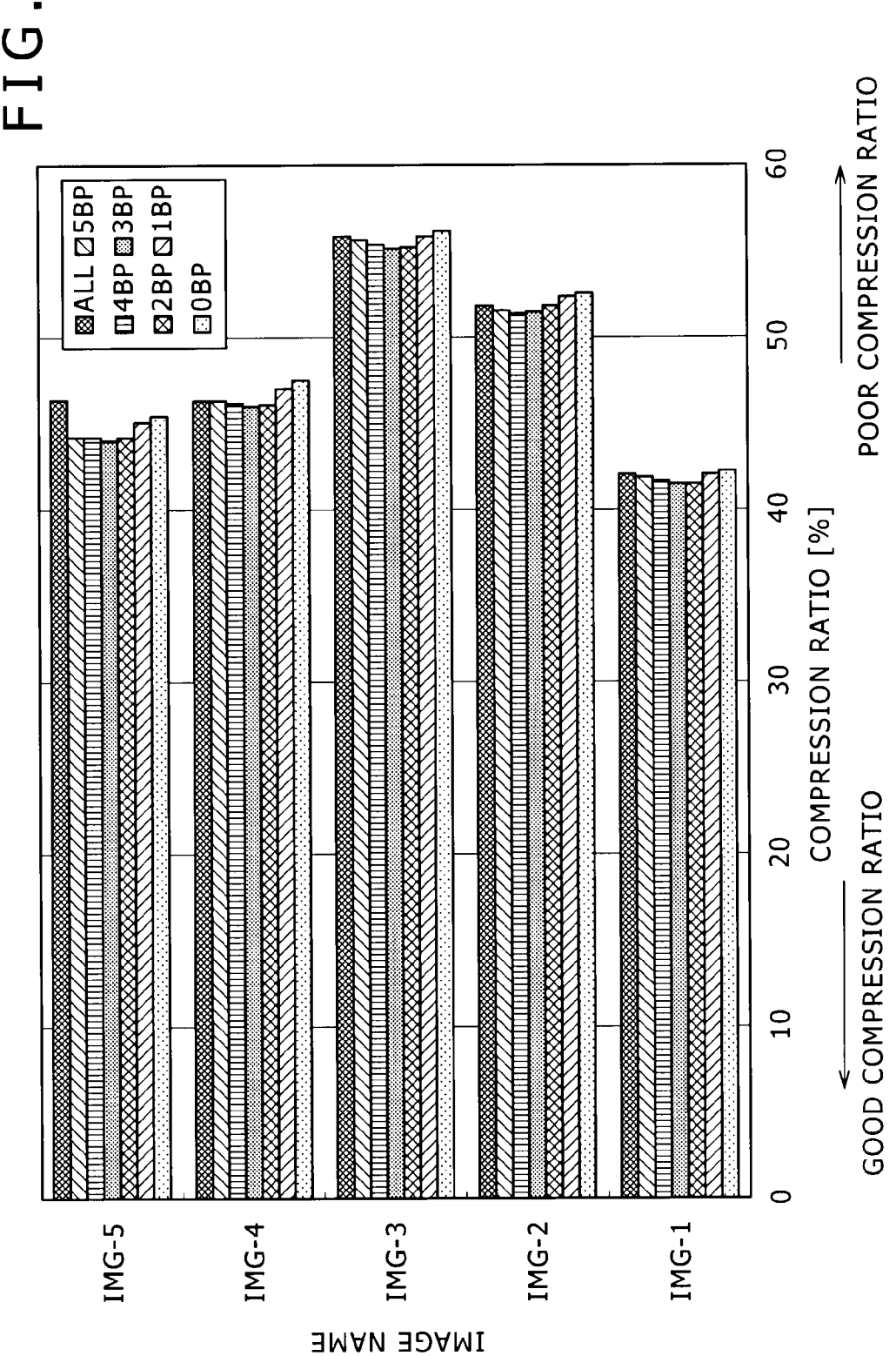
FIG. 11 is a diagram showing an example of relation between the number of compressed data selections and compression ratio.

The compression ratio and processing time when the coding is performed by the above-described encoder 100 will next be described with reference to FIG. 11 and FIG. 12. FIG. 11 is a diagram showing changes in compression ratio due to difference in bitplane at which the selecting section 106 changes selection.

"Img-1" to "Img-5" on an axis of ordinates in FIG. 11 denote five kinds of images that have been coded. An axis of abscissas indicates compression ratio (%). That is, a bar graph shown in FIG. 11 is to compare compression ratios of results of coding in a plurality of patterns in which the five kinds of images are coded.

Incidentally, the compression ratio indicated on the axis of abscissas of FIG. 11 is calculated by dividing the data size of compressed data after the coding by the data size of non-compressed data before the coding. That is, the smaller the data size of compressed data after the coding, the smaller the value of the compression ratio (%), and the better the compression ratio. Conversely, the larger the data size of compressed data after the coding, the larger the value of the compression ratio (%), and the worse the compression ratio.

In the example of FIG. 11, each piece of image data of "Img-1" to "Img-5" is coded in seven kinds of patterns. "ALL" corresponding to an uppermost bar of seven bars is a pattern in which the selecting section 106 selects a bitplane after the coding (compressed data) at all places. The pattern is that of what is called an ordinary coding method.

"5BP" corresponding to a second bar from the top of the seven bars is a pattern in which the selecting section 106 selects a bitplane after the coding (compressed data) in six highest-order bitplanes (bitplane numbers 0 to 5) excluding zero bitplanes. That is, in this case, the selecting section 106 selects a bitplane before the coding (non-compressed data) at a seventh place and subsequent places, and makes the entropy coding process therefor omitted.

"4BP" corresponding to a third bar from the top of the seven bars is a pattern in which the selecting section 106 selects a bitplane after the coding (compressed data) in five highest-order bitplanes (bitplane numbers 0 to 4) excluding zero bitplanes. That is, in this case, the selecting section 106 selects a bitplane before the coding (non-compressed data) at a sixth place and subsequent places, and makes the entropy coding process therefor omitted.

"3BP" corresponding to a fourth bar from the top of the seven bars is a pattern in which the selecting section 106 selects a bitplane after the coding (compressed data) in four highest-order bitplanes (bitplane numbers 0 to 3) excluding zero bitplanes. That is, in this case, the selecting section 106 selects a bitplane before the coding (non-compressed data) at a fifth place and subsequent places, and makes the entropy coding process therefor omitted.

"2BP" corresponding to a fifth bar from the top of the seven bars is a pattern in which the selecting section 106 selects a bitplane after the coding (compressed data) in three highest-order bitplanes (bitplane numbers 0 to 2) excluding zero bitplanes. That is, in this case, the selecting section 106 selects a bitplane before the coding (non-compressed data) at a fourth place and subsequent places, and makes the entropy coding process therefor omitted.

"1BP" corresponding to a sixth bar from the top of the seven bars is a pattern in which the selecting section 106 selects a bitplane after the coding (compressed data) in two highest-order bitplanes (bitplane numbers 0 to 1) excluding zero bitplanes. That is, in this case, the selecting section 106 selects a bitplane before the coding (non-compressed data) at a third place and subsequent places, and makes the entropy coding process therefor omitted.

"0BP" corresponding to a lowermost bar of the seven bars is a pattern in which the selecting section 106 selects a bitplane after the coding (compressed data) in the highest-order bitplane (bitplane number 0) excluding zero bitplanes. That is, in this case, the selecting section 106 selects a bitplane before the coding (non-compressed data) at a second place and subsequent places, and makes the entropy coding process therefor omitted.

As shown in FIG. 11, any of the patterns in which the image data of "Img-1" to "Img-5" is compressed does not produce a great difference in the compression ratio. For example, a comparison between the compression ratio of the pattern of "3BP" in which the compression ratio tends to be lowest and the compression ratio of the pattern of "0BP" in which the compression ratio tends to be highest in each image indicates that the difference is about one percentage point or less.

Figure 12:
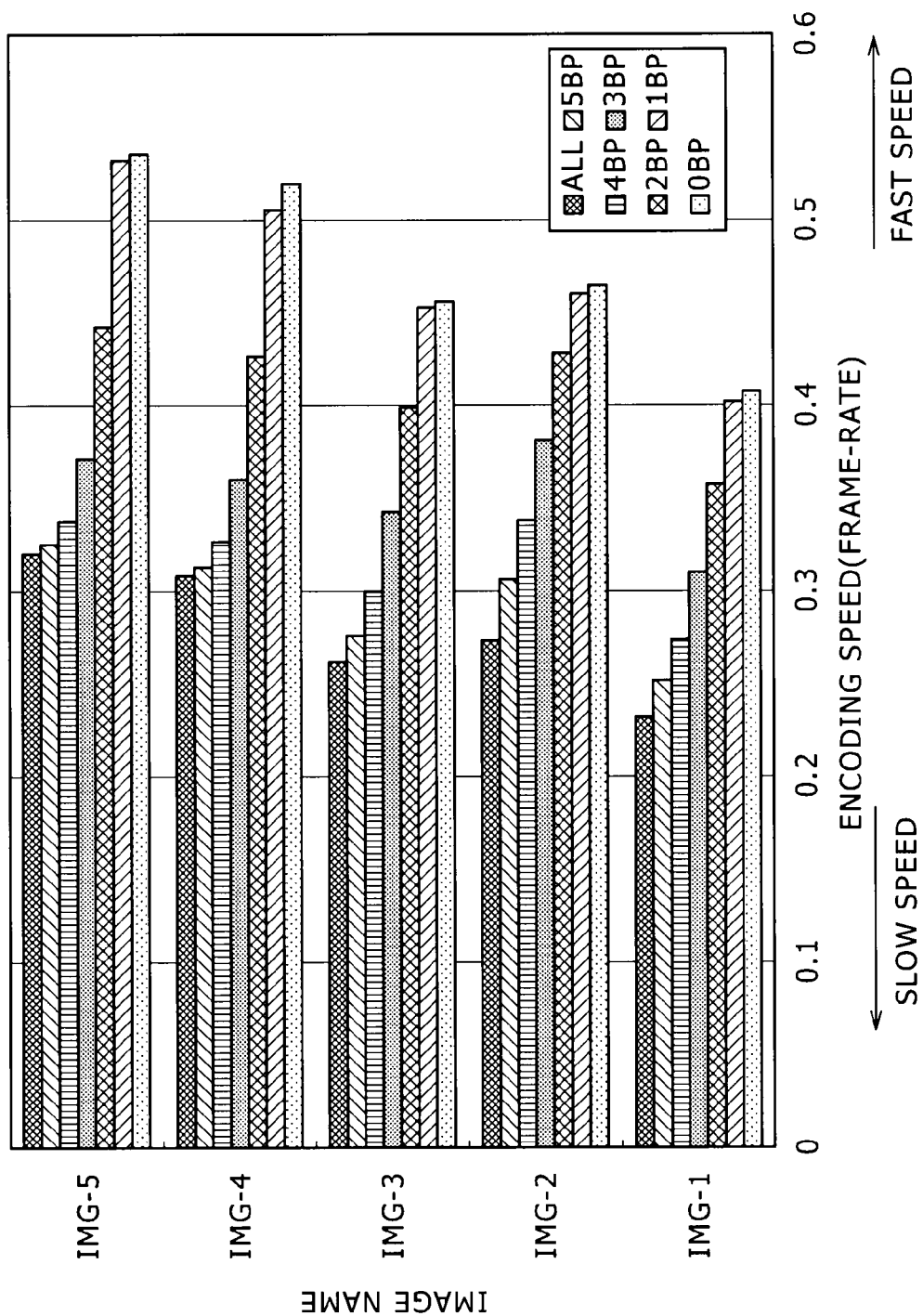
FIG. 12 is a diagram showing an example of relation between the number of compressed data selections and processing speed.

FIG. 12 is a diagram showing changes in the time of the coding process due to difference in bitplane at which the selecting section 106 changes selection.

The bar graph shown in FIG. 12 can basically be viewed in the same manner as in FIG. 11. However, an axis of abscissas indicates the speed (frame rate) of the coding process. The larger the numerical value of the speed, the faster the processing speed and the shorter the processing time. That is, the bar graph shown in FIG. 12 is to compare the speeds of respective coding processes when each image data of "Img-1" to "Img-5" is coded in the seven patterns of "ALL" to "0BP" which patterns are the same as in FIG. 11.

As shown in FIG. 12, the processing speed varies greatly depending on each pattern. Of course, as the number of bitplanes subjected to the coding process is decreased, that is, in a pattern in which the selecting section 106 selects a bitplane before the coding at a higher place, the processing speed becomes significantly faster. For example, the processing speed of the pattern of "0BP" in which a bitplane before the coding is selected at the highest place excluding zero bitplanes is nearly twice faster than the processing speed of the pattern of "ALL" in which a bitplane after the coding is selected at all places.

That is, by coding only a part of bitplanes at high places, the encoder 100 can reduce the processing amount of the coding process while suppressing degradation in compression ratio to a degree where no practical problem is presented. The reduction of the processing amount improves the processing speed of the coding process, and shortens the processing time. In addition, the reduction of the processing amount makes it possible to lower hardware specifications necessary for the coding process, and thus reduce the cost of the encoder 100. In addition, by shortening the processing time, the operation cost of the coding process such as electricity charges, personnel expenses and the like can also be reduced. Further, by shortening the processing time, it is possible also to increase the processing amount within a fixed time, and thus to improve productivity. That is, the encoder 100 can provide overwhelmingly great advantages as compared with disadvantages.

However, because the compression ratio is degraded to an extreme degree when none of the bitplanes are coded, it may be necessary to code at least a bitplane at the highest place (bitplane number 0) excluding zero bitplanes.

Incidentally, as shown in FIG. 11 and FIG. 12, characteristics of such coding do not depend greatly on the contents of the image data being processed. That is, the encoder 100 can reduce the processing amount without greatly degrading the compression ratio irrespective of the contents of an image.

In particular, as described above, the selecting section 106 determines whether to select a bitplane before the coding by comparing the target compression ratio with an actual compression ratio. Thus, when the compression ratio is sufficiently good, the selecting section 106 selects a bitplane after the coding. In other words, the entropy coding process is omitted when the compression ratio is sufficiently poor and thus the effect of compression is small. Thus, the selecting section 106 can reduce unnecessary degradation in compression ratio due to the omission of the entropy coding process. In other words, the encoder 100 can further reduce the dependence of degradation in compression ratio and reduction in processing amount by the above-described process on the contents of the image being coded.

Incidentally, the target compression ratio may be any value. In addition, the target compression ratio may be changed in each arbitrary data unit (an arbitrary value can be set independently of others).

For example, the target compression ratio may be set in code block units. In this case, while fine control is made possible, there is a fear of correspondingly increasing an amount of data on the target compression ratio and complicating the process by changing the target compression ratio in each code block, for example.

In addition, for example, the target compression ratio may be set in subband units of wavelet coefficients. As shown in FIG. 2, the higher the frequency of a component as a subband of wavelet coefficients, the larger the number of code blocks (the larger the amount of data) included in the subband. In addition, as described above, energy concentrates on a lower-frequency component as a subband of wavelet coefficients. That is, a lower-frequency component has a greater effect on image quality. Accordingly, utilizing such characteristics of subbands of wavelet coefficients, the encoder 100 sets the target compression ratio low so as to leave more information of a lower-frequency component having a greater effect on image quality, and sets the target compression ratio high so as to reduce more information of a higher-frequency component having a great effect on an amount of information. Thus, the encoder 100 can code image data in such a manner as to reduce degradation in image quality and to improve compression efficiency.

Further, the target compression ratio may be set in picture units, for example. As shown in FIG. 11, the compression ratio is not completely independent of the contents of the image. For example, in the case of a more complex image including a large amount of high-frequency component, there is a fear of not only an increase in the load of the process of coding the image but also a decrease in compression ratio. Conversely, in the case of a simple image such as a black image, for example, the load of the coding process is low, and the compression ratio can be raised easily. By setting the target compression ratio according to the contents of such images, the load of the coding process can be reduced more efficiently.

While a selection change is controlled on the basis of comparison of the compression ratio with the target compression ratio in the above description, the number of bitplanes for which compressed data is selected may be set in advance, of course.

That is, in this case, the selecting section 106 changes the data to be selected from compressed data to non-compressed data at the bitplane of a place when a predetermined number of places are counted from a highest place excluding zero bitplanes regardless of the compression ratio of a coding result.

2. Second Embodiment

[Example of Configuration of Selecting Section]

Figure 13:
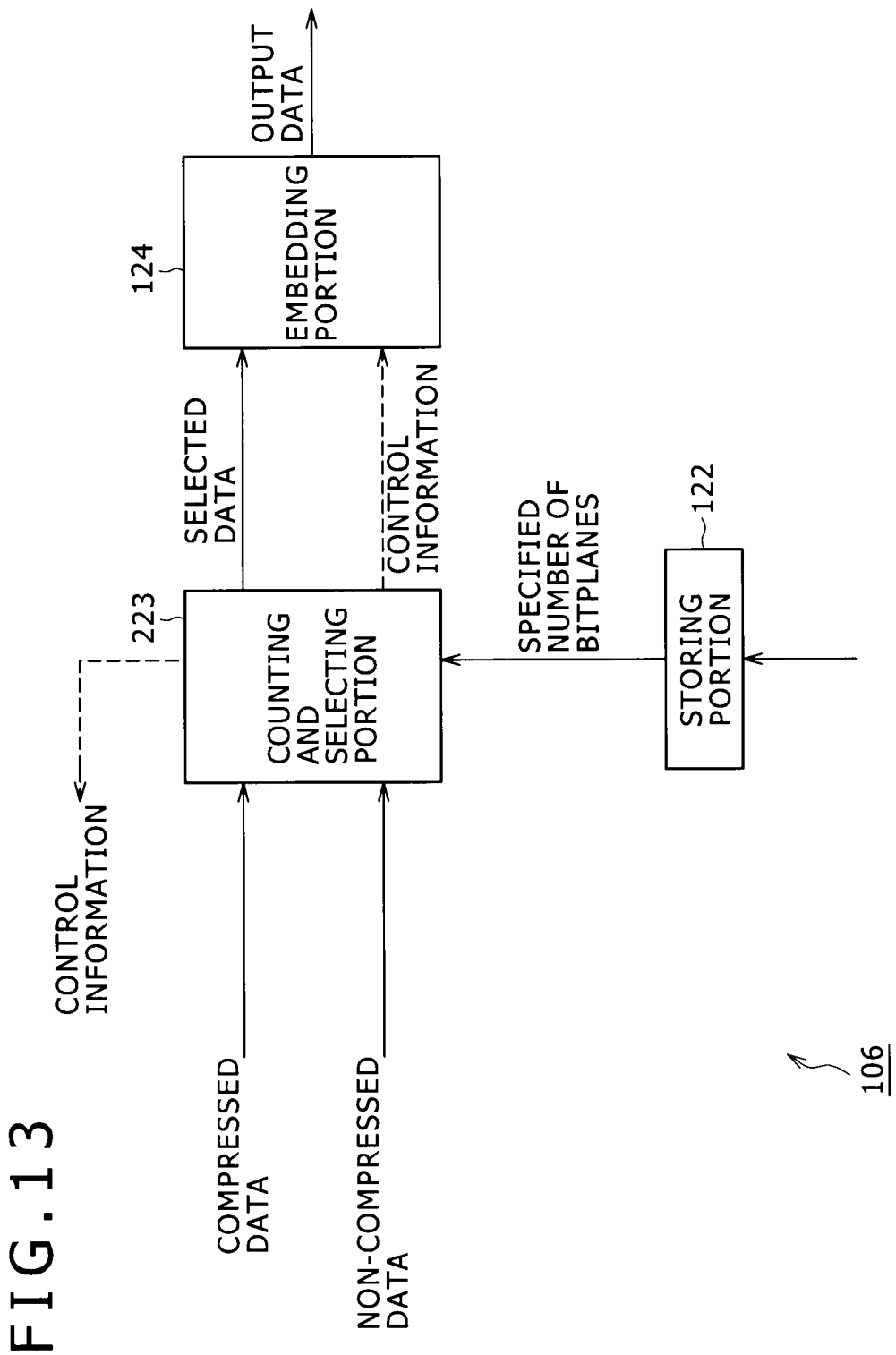
FIG. 13 is a block diagram showing another example of configuration of the selecting section.

FIG. 13 is a block diagram showing an example of detailed configuration of the selecting section 106 in that case. Similar parts to those described with reference to FIG. 7 are identified by the same reference numerals.

In the example of FIG. 13, the selecting section 106 selects compressed data obtained by coding in the coding section 105, and counts the number of bitplanes. Then, when the number of bitplanes exceeds a predetermined number, the selecting section 106 changes the selection to non-compressed data before the coding. Then, for bitplanes at lower places, the selecting section 106 controls the coding section 105 to stop the coding process, and selects non-compressed bitplanes.

In order to perform such a process, the selecting section 106 has a counting and selecting portion 223 in place of the compression ratio calculating portion 121 and the compression ratio comparing and selecting portion 123 in FIG. 7.

The counting and selecting portion 223 selects compressed data as a result of coding of image data in an initial state, and counts (totals) the number of bitplanes. A storing portion 122 stores a specified number of bitplanes in place of the target compression ratio. The specified number of bitplanes is a value specifying the number of bitplanes for which compressed data is selected, and is input in advance at a time of shipment from a factory or a time of a start of the coding process, for example. The storing portion 122 supplies the specified number of bitplanes to the counting and selecting portion 223 in predetermined timing. Incidentally, the storing portion 122 may be formed by a ROM storing the specified number of bitplanes in advance. In addition, the storing portion 122 may be included in the counting and selecting portion 223. Further, the specified number of bitplanes may be input by a user or another processing section, for example, each time the counting and selecting portion 223 needs the specified number of bitplanes. In this case, the storing portion 122 may be omitted.

When a count value counted by the counting and selecting portion 223 exceeds the specified number of bitplanes, the counting and selecting portion 223 selects non-compressed data supplied from the bitplane expanding section 104 as a result of coding of the image data. In this case, the counting and selecting portion 223 supplies control information to the coding section 105 so as not to perform the process of coding bitplanes at lower places of the code block. Then, the counting and selecting portion 223 selects non-compressed data for all of the lower places of the code block.

The counting and selecting portion 223 supplies the thus selected bitplanes (selected data) to an embedding portion 124. The counting and selecting portion 223 further supplies the embedding portion 124 with information on the data selection as control information.

The embedding portion 124 embeds predetermined information in a predetermined position of the selected data supplied from the counting and selecting portion 223, and thereby generates output data. The embedding portion 124 supplies the generated output data (code stream) to the packet generating section 107.

Suppose that the specified number of bitplanes is four, for example. In this case, as shown in FIG. 14, the encoder 100 codes four bitplanes of bitplane numbers "0" to "3" for each of the CP pass, the SP pass, and the MR pass. For bitplanes of a bitplane number "4" and subsequent numbers exceeding the specified number of bitplanes, the encoder 100 omits the coding process, and outputs non-compressed data. In the CP pass, in particular, the non-compressed data is padded so as to coincide with a byte boundary, and is thereafter terminated.

Suppose that the specified number of bitplanes is two, for example. In this case, as shown in FIG. 15, the encoder 100 codes two bitplanes of bitplane numbers "0" and "1" for each of the CP pass, the SP pass, and the MR pass. For bitplanes of a bitplane number "2" and subsequent numbers exceeding the specified number of bitplanes, the encoder 100 omits the coding process, and outputs non-compressed data. In the CP pass, in particular, the non-compressed data is padded so as to coincide with a byte boundary, and is thereafter terminated.

As described above, the selecting section 106 in this case is able to code bitplanes equal in number to the specified number of bitplanes, and not to code the following bitplanes. In other words, by the specified number of bitplanes, the encoder 100 can control a position (place) at which non-compressed data is selected by the selecting section 106 more surely than in the case of using the above-described target compression ratio.

[Description of Operation]

Figure 16:
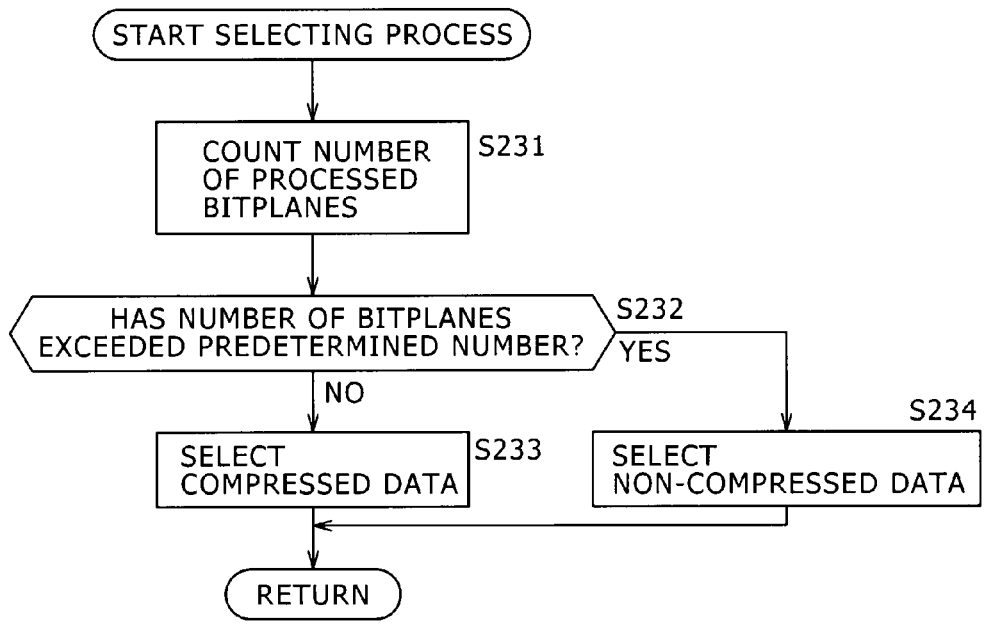
FIG. 16 is a flowchart of assistance in explaining another example of the flow of the selecting process.

Incidentally, a coding process in this case is basically performed in a similar manner to that described with reference to the flowchart of FIG. 9. An example of a detailed flow of a selecting process in this case which process is performed in Step S107 in FIG. 9 will next be described with reference to a flowchart of FIG. 16.

When the selecting process is started, the counting and selecting portion 223 in Step S231 counts the number of processed bitplanes. In Step S232, the counting and selecting portion 223 determines whether the number of processed bitplanes has exceeded a predetermined number (specified number of bitplanes).

When the counting and selecting portion 223 determines that the number of processed bitplanes has not exceeded the predetermined number, the process proceeds to Step S233. In Step S233, the counting and selecting portion 223 selects compressed data supplied from the coding section 105. After selecting the compressed data, the counting and selecting portion 223 ends the selecting process, returns the process to Step S107 in FIG. 9, and advances the process to Step S109.

When the counting and selecting portion 223 determines that the number of processed bitplanes has exceeded the predetermined number, the process proceeds to Step S234. In Step S234, the counting and selecting portion 223 selects non-compressed data supplied from the bitplane expanding section 104. After selecting the non-compressed data, the counting and selecting portion 223 ends the selecting process, returns the process to step S107 in FIG. 9, and advances the process to Step S109.

Thus, the counting and selecting portion 223 makes bitplanes coded at places the number of which is specified by the specified number of bitplanes from a highest place excluding zero bitplanes, and selects compressed data. The counting and selecting portion 223 selects non-compressed data without making bitplanes coded at the other lower places.

Thereby, as in the case of using the above-described compression ratio, the selecting section 106 can reduce the processing amount of the coding while suppressing degradation in compression ratio. In this case, a place at which selection is changed can be specified directly. Therefore the encoder 100 can code bitplanes to a desired place more surely than in the case of the above-described compression ratio.

Incidentally, the specified number of bitplanes may be any value. In addition, as with the target compression ratio, the specified number of bitplanes may be changed in each arbitrary data unit such for example as a code block unit, the unit of a subband of wavelet coefficients, or a picture unit (an arbitrary value can be set independently of others).

Further, control may be performed using both the target compression ratio and the specified number of bitplanes described above. For example, the selecting section 106 basically controls the changing of selection of compression and non-compression on the basis of the target compression ratio. Then, an upper limit value of the number of bitplanes for which compressed data is selected is set so that the selecting section 106 does not select compressed data beyond the upper limit.

3. Third Embodiment

[Example of Configuration of Selecting Section]

Figure 17:
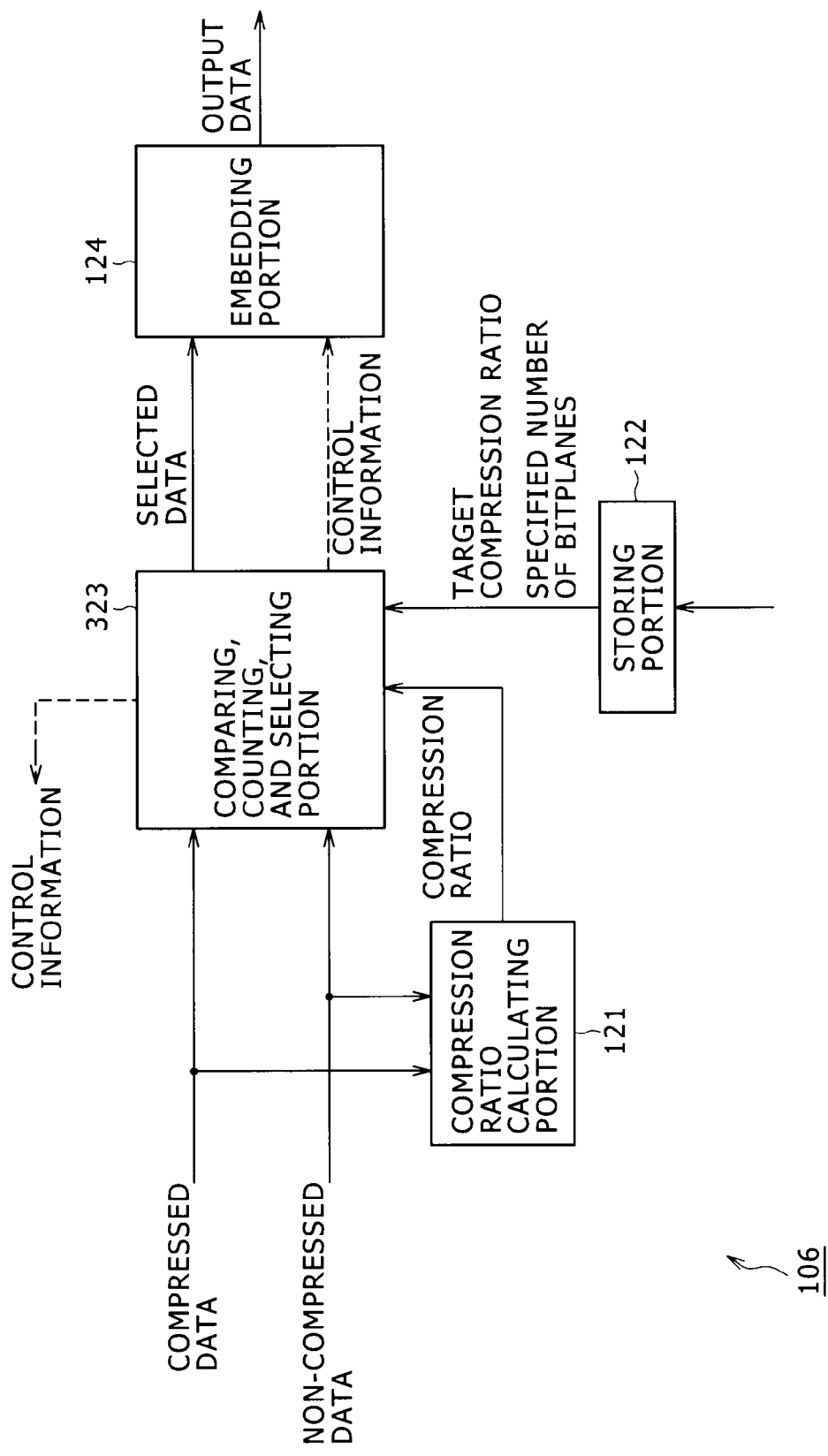
FIG. 17 is a block diagram showing yet another example of configuration of the selecting section.

FIG. 17 is a block diagram showing an example of detailed configuration of the selecting section 106 in that case. Similar parts to those described with reference to FIG. 7 and FIG. 13 are identified by the same reference numerals.

In the example of FIG. 17, the selecting section 106 selects compressed data obtained by coding in the coding section 105 on the basis of the target compression ratio, and counts the number of bitplanes. Then, when the number of bitplanes exceeds a predetermined number, the selecting section 106 changes the selection to non-compressed data before the coding even if the compression ratio of the bitplane is higher than the target compression ratio. Then, for bitplanes at lower places, the selecting section 106 controls the coding section 105 to stop the coding process, and selects non-compressed bitplanes.

In order to perform such a process, the selecting section 106 has a comparing, counting, and selecting portion 323 in place of the compression ratio comparing and selecting portion 123 in FIG. 7.

The comparing, counting, and selecting portion 323 selects compressed data as a result of coding of image data in an initial state. In addition, while the comparing, counting, and selecting portion 323 selects compressed data, a compression ratio calculating portion 121 calculates the compression ratio of the compressed data. The calculating method is the same as described with reference to FIG. 7. As with the compression ratio comparing and selecting portion 123 described with reference to FIG. 7, the comparing, counting, and selecting portion 323 compares the compression ratio with the target compression ratio supplied from a storing portion 122, and selects non-compressed data as a result of coding of the image data when the compression ratio is lower than the target compression ratio. That is, the comparing, counting, and selecting portion 323 changes selection to non-compressed data. Incidentally, the target compression ratio is a similar parameter to that described with reference to FIG. 7. For bitplanes at lower places, the comparing, counting, and selecting portion 323 controls the coding section 105 to stop an entropy coding process, and selects non-compressed data.

When selecting compressed data, as with the counting and selecting portion 223 described with reference to FIG. 13, the comparing, counting, and selecting portion 323 counts the number of selected bitplanes. When the count value exceeds a specified number of bitplanes which number is supplied from the storing portion 122, even if the compression ratio is more than the target compression ratio, the comparing, counting, and selecting portion 323 selects non-compressed data as a result of coding of image data (changes selection to non-compressed data). For bitplanes at lower places, the comparing, counting, and selecting portion 323 controls the coding section 105 to stop the entropy coding process, and selects non-compressed data.

As with the compression ratio comparing and selecting portion 123 in FIG. 7, the comparing, counting, and selecting portion 323 supplies the selected data and control information to an embedding portion 124. As in FIG. 7, the embedding portion 124 embeds the control information in a predetermined position of a code stream of the selected data, and thereby generates output data. The embedding portion 124 supplies the generated output data (code stream) to the packet generating section 107.

As described above, the selecting section 106 in this case can control the coding of bitplanes by the target compression ratio, and set an upper limit (define a maximum number) of bitplanes to be coded.

For example, in the case where compression and non-compression are selected using the target compression ratio as described with reference to FIG. 7 and the like, control by the target compression ratio may not work when the target compression ratio is set inappropriately for images to be processed. For example, because of an inappropriate value of the target compression ratio, all bitplanes may be coded in any code block. That is, as a result, the processing amount of the coding method may be similar to that of the method in the past, and an obtained effect may be reduced.

When the number of bitplanes to be coded is specified directly as described with reference to FIG. 13 and the like, it is difficult to perform control according to an image because the position at which selection is changed is fixed.

By selecting compression and non-compression using the target compression ratio and setting an upper limit to the selection of the compressed data as described above with reference to FIG. 17, it is possible to perform control according to an image and to ensure (guarantee) an effect (reduction of the processing amount). In other words, an allowable setting range of the target compression ratio is extended, and thus the setting of the target compression ratio becomes easy. Further, in other words, the processing amount can be reduced sufficiently regardless of the contents of an image, and thus the versatility of the encoder 100 can be improved.

[Description of Operation]

Figure 18:
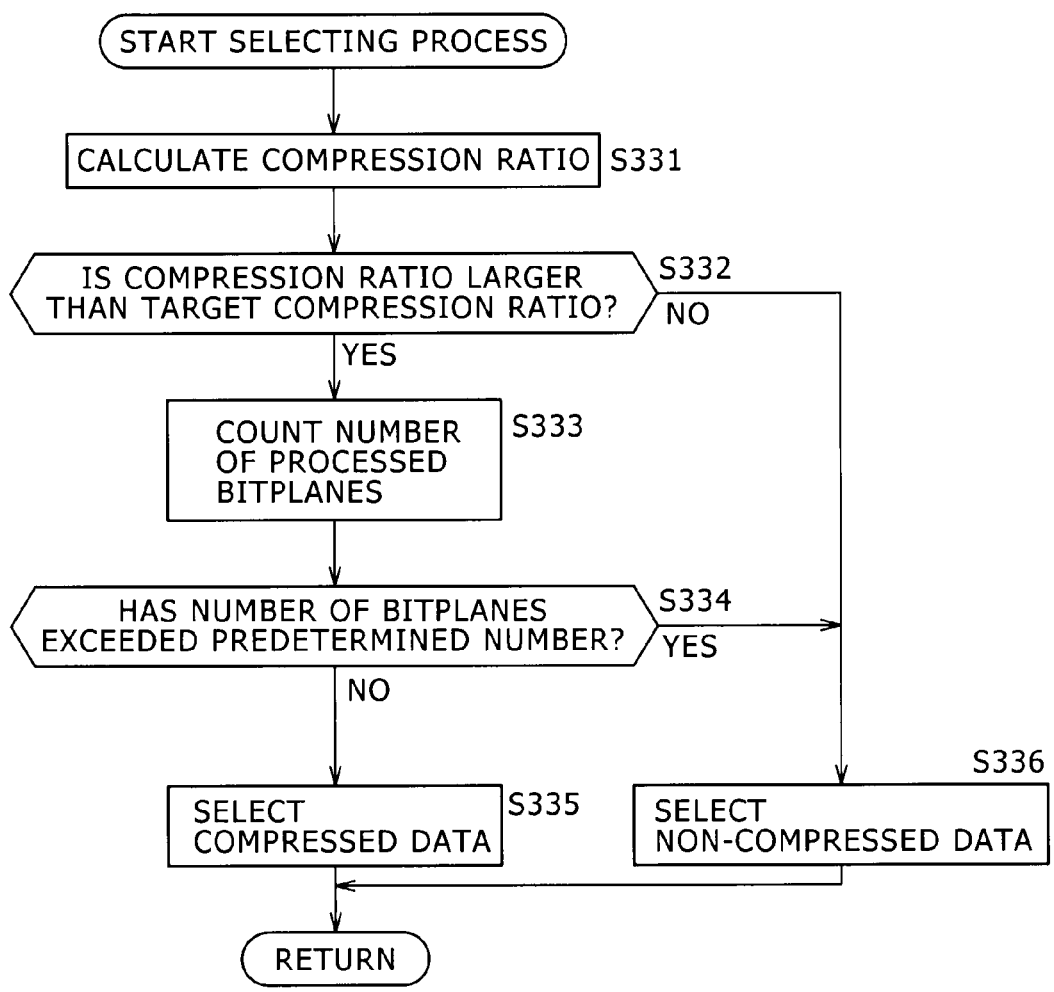
FIG. 18 is a flowchart of assistance in explaining yet another example of the flow of the selecting process.

Incidentally, a coding process in this case is basically performed in a similar manner to that described with reference to the flowchart of FIG. 9. An example of a detailed flow of a selecting process in this case which process is performed in Step S107 in FIG. 9 will be described with reference to a flowchart of FIG. 18.

Figure 10:
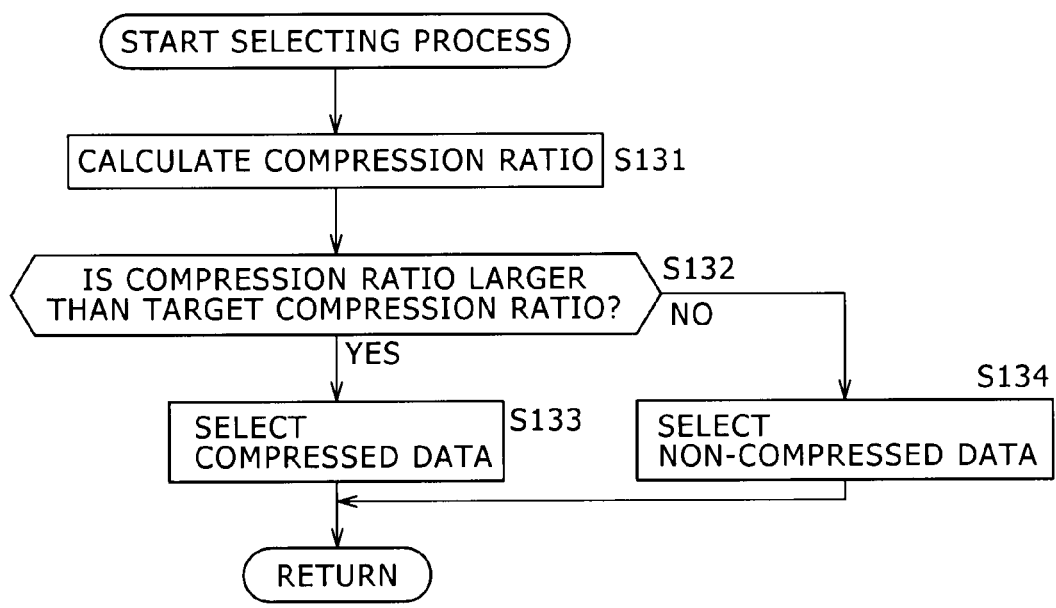
FIG. 10 is a flowchart of assistance in explaining an example of a flow of a selecting process.

When the selecting process is started, the compression ratio calculating portion 121 in Step S331 calculates the compression ratio of compressed data as in Step S131 in FIG. 10. In Step S332, the comparing, counting, and selecting portion 323 determines whether the calculated compression ratio is higher than the target compression ratio as in Step S132 in FIG. 10.

When the comparing, counting, and selecting portion 323 determines that the compression ratio is higher than the target compression ratio, the process proceeds to Step S333. In Step S333, the comparing, counting, and selecting portion 323 counts the number of processed bitplanes as in Step S231 in FIG. 16. In Step S334, the comparing, counting, and selecting portion 323 determines whether the number of processed bitplanes has exceeded a predetermined number (specified number of bitplanes) as in Step S232 in FIG. 16.

When the comparing, counting, and selecting portion 323 determines that the number of processed bitplanes has not exceeded the predetermined number, the process proceeds to Step S335. In Step S335, the comparing, counting, and selecting portion 323 selects compressed data supplied from the coding section 105 as in Step S133 in FIG. 10 and Step S233 in FIG. 16. After selecting the compressed data, the comparing, counting, and selecting portion 323 ends the selecting process, returns the process to Step S107 in FIG. 9, and advances the process to Step S109.

When the comparing, counting, and selecting portion 323 determines in Step S334 that the number of processed bitplanes has exceeded the predetermined number, the process proceeds to Step S336. Further, when the comparing, counting, and selecting portion 323 determines in Step S332 that the compression ratio is not higher than the target compression ratio, the process proceeds to Step S336. In Step S336, the comparing, counting, and selecting portion 323 selects non-compressed data supplied from the bitplane expanding section 104 as in Step S134 in FIG. 10 and Step S234 in FIG. 16. After selecting the non-compressed data, the comparing, counting, and selecting portion 323 ends the selecting process, returns the process to Step S107 in FIG. 9, and advances the process to Step S109.

That is, the comparing, counting, and selecting portion 323 not only calculates the compression ratio and compares the compression ratio with the target compression ratio but also counts the number of processed bitplanes when the compression ratio is higher than the target compression ratio and compares the count value with the specified number of bitplanes.

By thus performing control, the selecting section 106 can select non-compressed data on the basis of the specified number of bitplanes even when the compression ratio is higher than the target compression ratio. Thereby the encoder 100 can perform control according to an image and ensure (guarantee) an effect (reduction of the processing amount) as described above.

Incidentally, as in the other cases described above, the specified number of bitplanes and the target compression ratio may be any value, and may be changed in each arbitrary data unit (an arbitrary value can be set independently of others).

While the above description has been made of cases where the target compression ratio and the specified number of bitplanes are used as a parameter used in selecting compressed data and non-compressed data, the parameter may be any parameter as long as the parameter can be used in selecting compressed data and non-compressed data. For example, the parameter may be information indirectly specifying the target compression ratio or the specified number of bitplanes. For example, in the case of the specified number of bitplanes, the parameter may be the number of bitplanes for which compressed data is selected, the bitplane number of a bitplane where selection is changed, or the number of bitplanes for which non-compressed data is selected. In addition, for example, a target code quantity may be set in place of the target compression ratio. Further, for example, a processing time may be measured, and non-compressed data may be selected after the passage of a predetermined time. In addition, for example, a total code quantity of selected data may be measured, and non-compressed data may be selected when the total code quantity exceeds a predetermined code quantity. Of course, compressed data and non-compressed data may be selected using parameters other than the above parameters.

In addition, the parameter may be able to be set (changed) as required. For example, the specified number of bitplanes may be able to be set (changed) by the selecting section 106.

4. Fourth Embodiment

[Example of Configuration of Selecting Section]

Figure 19:
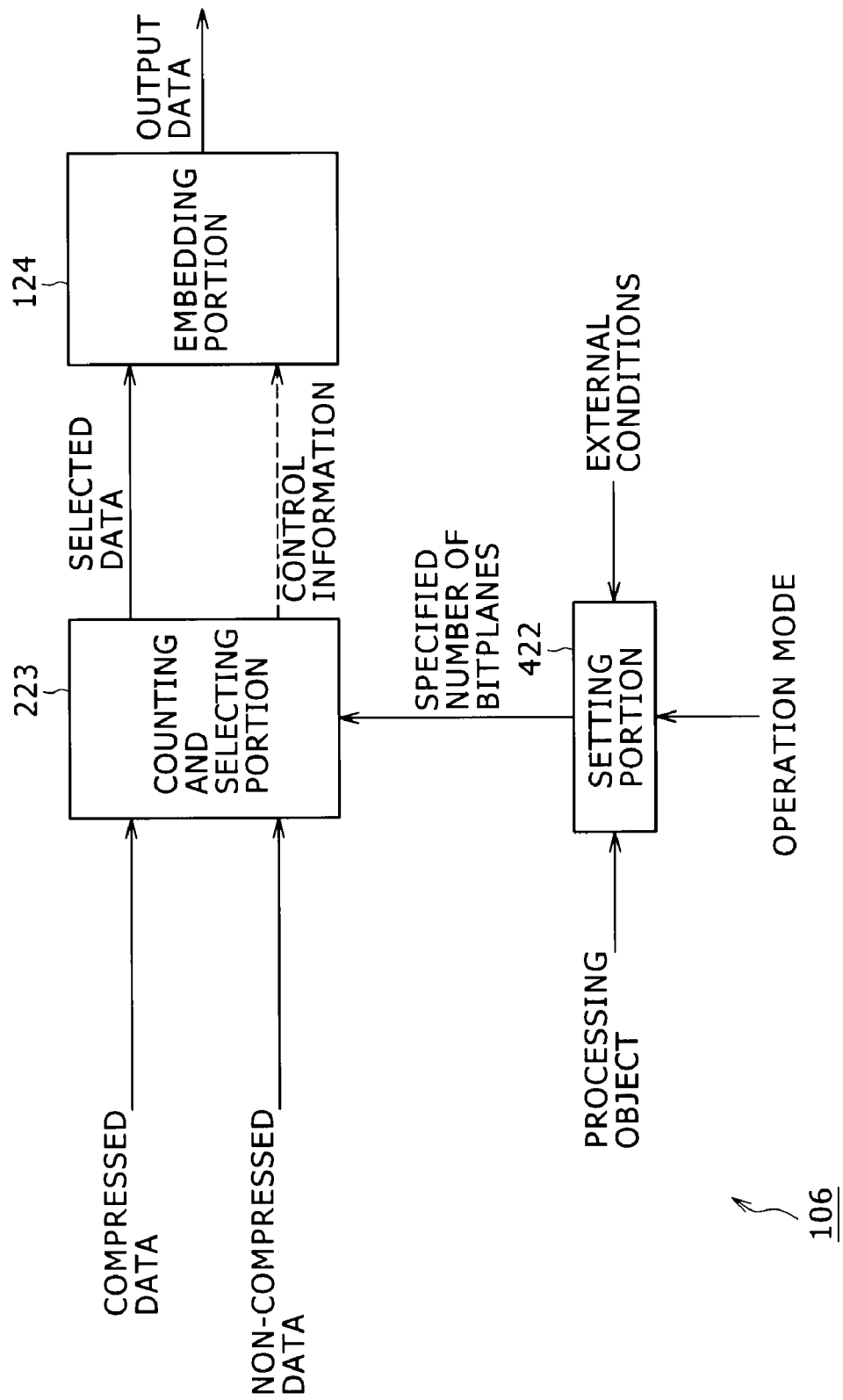
FIG. 19 is a block diagram showing yet another example of configuration of the selecting section.

FIG. 19 is a block diagram showing an example of detailed configuration of the selecting section 106 in that case. Similar parts to those described with reference to FIG. 7 and FIG. 13 are identified by the same reference numerals.

In the example of FIG. 19, the selecting section 106 sets a specified number of bitplanes according to various conditions, and controls the selection of compressed data and non-compressed data using the specified number of bitplanes.

In order to perform such a process, the selecting section 106 has a setting portion 422 in place of the storing portion 122 in FIG. 13. Specifically, in the case of FIG. 19, the selecting section 106 has the setting portion 422, a counting and selecting portion 223, and an embedding portion 124.

The setting portion 422 sets a specified number of bitplanes on the basis of various conditions in predetermined timing, and supplies the set specified number of bitplanes to the counting and selecting portion 223.

For example, the setting portion 422 sets the specified number of bitplanes on the basis of image data being processed. More specifically, the setting portion 422 sets an appropriate specified number of bitplanes on the basis of standards of image data such as data size, resolution, a frame rate or the like, the contents of an image, or the like. For example, in a case of a large data size or a high resolution of image data being processed or a high frame rate, the setting portion 422 prioritizes the reduction of the processing amount of coding for cost reduction, and sets the specified number of bitplanes to a small value. In addition, when degradation in compression efficiency is expected due to complex contents of the image, the setting portion 422 prioritizes the reduction of the processing amount of coding for cost reduction, and sets the specified number of bitplanes to a small value. Conversely, for example, when determining that improvement in compression ratio is to be prioritized in a case where the coding process is easy, a case where high compression efficiency can be expected, or the like, the setting portion 422 sets the specified number of bitplanes to a large value.

In addition, for example, the setting portion 422 sets the specified number of bitplanes according to the operation mode of the encoder 100. More specifically, the setting portion 422 sets an appropriate specified number of bitplanes according to an operation mode specified by a user or another device (or another processing section), for example. For example, when the user sets the operation mode of the encoder 100 to a compression ratio prioritizing mode, the setting portion 422 sets the specified number of bitplanes to a large value. For example, when the user sets the operation mode of the encoder 100 to a processing time prioritizing mode, the setting portion 422 sets the specified number of bitplanes to a small value.

Further, for example, the setting portion 422 sets an appropriate specified number of bitplanes on the basis of information on external conditions such as the capacity of a storage area where output packets are accumulated, an available bandwidth of a communication line through which output packets are transmitted, and the like. For example, when improvement in compression ratio is to be prioritized because the space of the storage area is reduced or the available bandwidth of the communication line is narrowed, the setting portion 422 sets the specified number of bitplanes to a large value. For example, when processing speed is to be prioritized because the space of the storage area is sufficiently large or the available bandwidth of the communication line is sufficiently wide, the setting portion 422 sets the specified number of bitplanes to a small value.

Thus, the setting portion 422 can set an appropriate value for information obtained in other than the encoder 100 as the specified number of bitplanes. At this time, the setting portion 422 may set the specified number of bitplanes freely, or may select the specified number of bitplanes from a number of candidates (choices) prepared in advance.

The counting and selecting portion 223 performs selection and control in a similar manner to that described with reference to FIG. 13 and the like on the basis of the thus set specified number of bitplanes.

As in the case of FIG. 13, the embedding portion 124 embeds control information in a predetermined position of a code stream of selected data, and thereby generates output data. The embedding portion 124 supplies the generated output data (code stream) to the packet generating section 107.

As described above, the selecting section 106 in this case can set the specified number of bitplanes, and control the coding of bitplanes using the value.

Incidentally, the setting portion 422 may set the specified number of bitplanes using a plurality of conditions among the various conditions described above. Further, the setting portion 422 may set the specified number of bitplanes on the basis of conditions other than the above-described conditions.

[Description of Operation]

An example of a flow of a coding process in this case will next be described with reference to a flowchart of FIG. 20. This coding process corresponds to the coding process described with reference to the flowchart of FIG. 9. Also in this case, the encoder 100 performs the coding process for each frame of a moving image.

Figure 9:
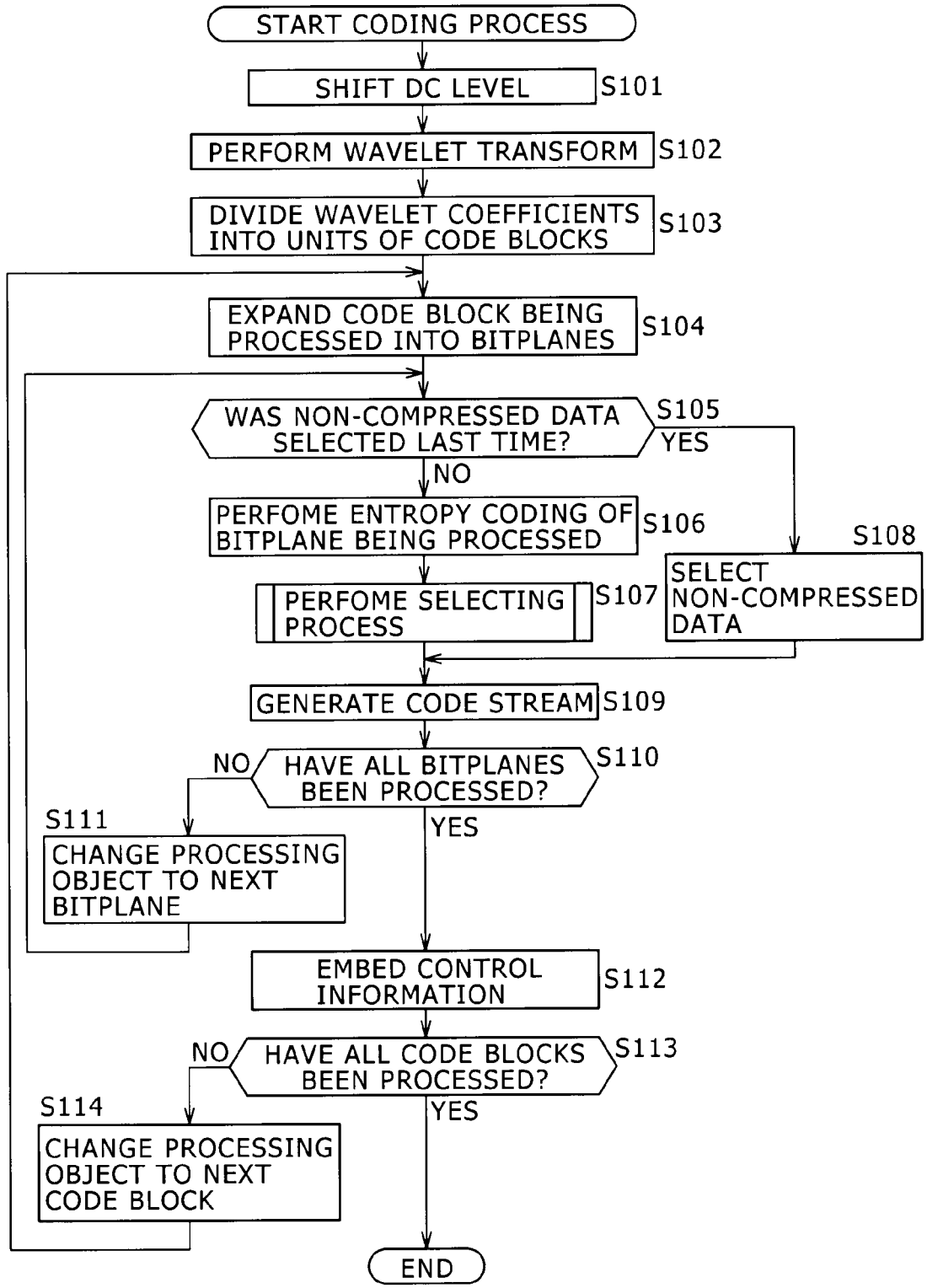
FIG. 9 is a flowchart of assistance in explaining an example of a flow of a coding process.
Figure 20:
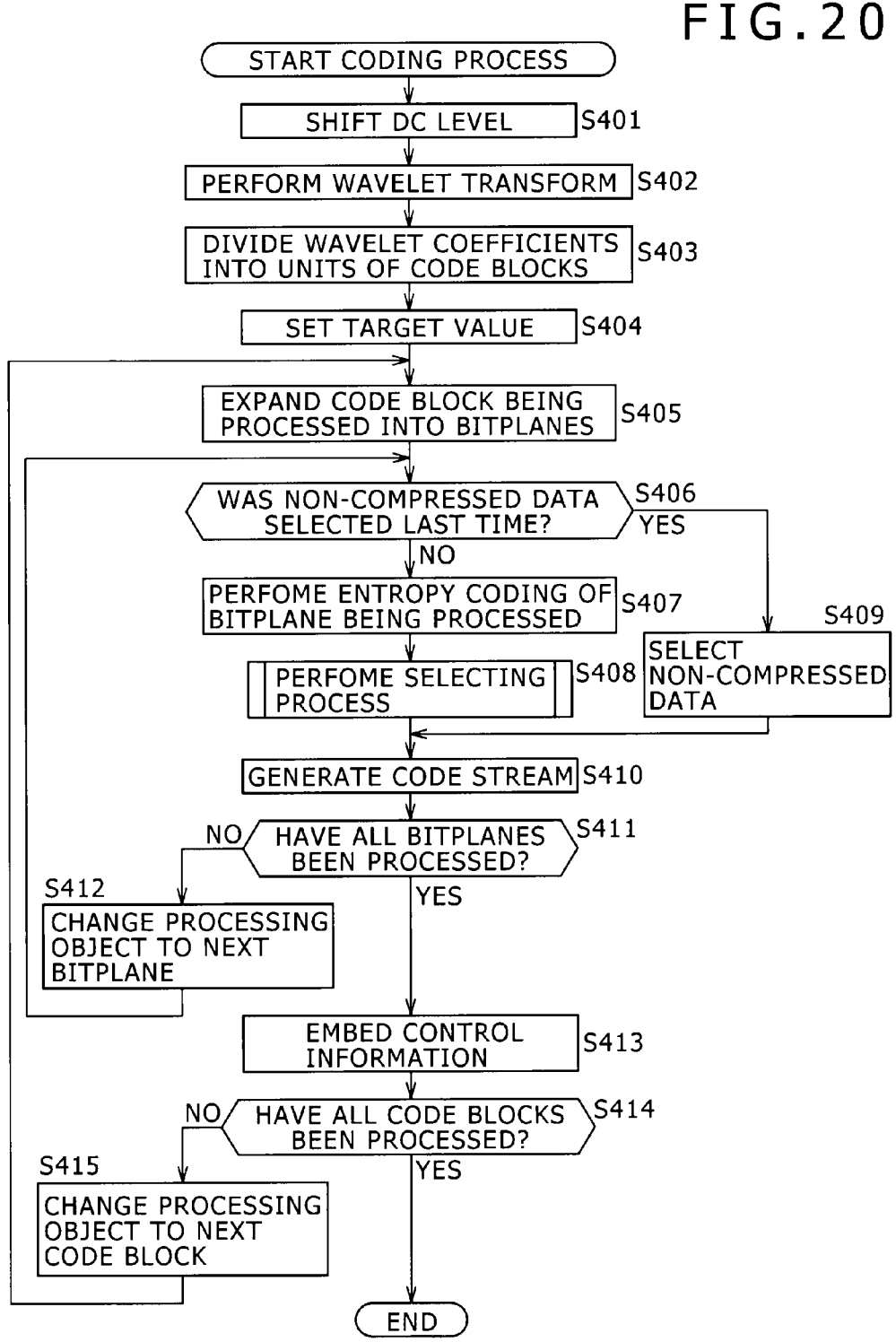
FIG. 20 is a flowchart of assistance in explaining another example of the flow of the coding process.

Each of processes of steps S401 to S403 shown in FIG. 20 is performed in a similar manner to that of each of processes of steps S101 to S103 shown in FIG. 9. Specifically, when the coding process is started, the DC level shift section 101 in Step S401 shifts the DC level of input image data. In Step S402, the wavelet transform section 102 subjects the image data to a wavelet transform. In Step S403, the code blocking section 103 divides wavelet coefficients into code block units.

In Step S404, the setting portion 422 sets a target value, that is, the specified number of bitplanes on the basis of various conditions as described above.

After the specified number of bitplanes is set, each of processes of steps S405 to S415 is performed in a similar manner to that of each of processes of steps S104 to S114 shown in FIG. 9.

Specifically, in Step S405, the bitplane expanding section 104 expands the coefficient data of each code block into bitplanes. In Step S406, the selecting section 106 sets a bitplane as processing object, and determines whether non-compressed data was selected last time. When the selecting section 106 determines that non-compressed data was not selected, the selecting section 106 advances the process to Step S407.

In Step S407, the coding section 105 performs entropy coding of the bitplane as processing object. In Step S408, the selecting section 106 performs a selecting process to select one of compressed data and non-compressed data. The selecting section 106 then advances the process to Step S410.

When the selecting section 106 determines in step S406 that non-compressed data was selected last time, the process proceeds to Step S409. In Step S409, the selecting section 106 selects non-compressed data. The selecting section 106 advances the process to Step S410 without the coding process being performed.

In Step S410, the selecting section 106 generates a code stream using the selected data. In Step S411, the selecting section 106 determines whether all bitplanes have been processed. When the selecting section 106 determines that not all the bitplanes have been processed, the selecting section 106 advances the process to step S412, where the selecting section 106 changes the processing object to a next bitplane. After the process of Step S412 is ended, the process returns to Step S406 to repeat the process from Step S406 on down.

When it is determined in Step S411 that all the bitplanes have been processed after the process of steps S406 to S412 is performed repeatedly, the process proceeds to Step S413. In Step S413, the embedding portion 124 in the selecting section 106 embeds control information such as information indicating a bitplane selection changing position, for example, in the code stream.

In Step S414, the selecting section 106 determines whether all code blocks have been processed. When the selecting section 106 determines that not all the code blocks have been processed, the selecting section 106 advances the process to Step S415, where the selecting section 106 changes the processing object to a highest-order bitplane among bitplanes of a next code block excluding zero bitplanes. After the process of Step S415 is ended, the process returns to Step S405 to repeat the process from Step S405 on down.

When it is determined in Step S414 that all the code blocks have been processed after the process of steps S405 to S415 is performed repeatedly, the coding process is ended.

By thus adjusting the number of bitplanes for which entropy coding is omitted according to conditions, the encoder 100 can appropriately reduce the load of the coding process.

Incidentally, the specified number of bitplanes is set in arbitrary timing, and can be specified in timing other than the above-described Step S404. Further, the specified number of bitplanes may be set in any data unit.

While the above description has been made of a case where the specified number of bitplanes is set, the type of the parameter is arbitrary, and any parameter can be set in a similar manner to that of the specified number of bitplanes. For example, also in a case where compressed data and non-compressed data are selected using the target compression ratio, a setting section for setting the target compression ratio may be provided as in the case of the specified number of bitplanes as described above.

5. Fifth Embodiment

[Example of Configuration of Decoder]

Figure 21:
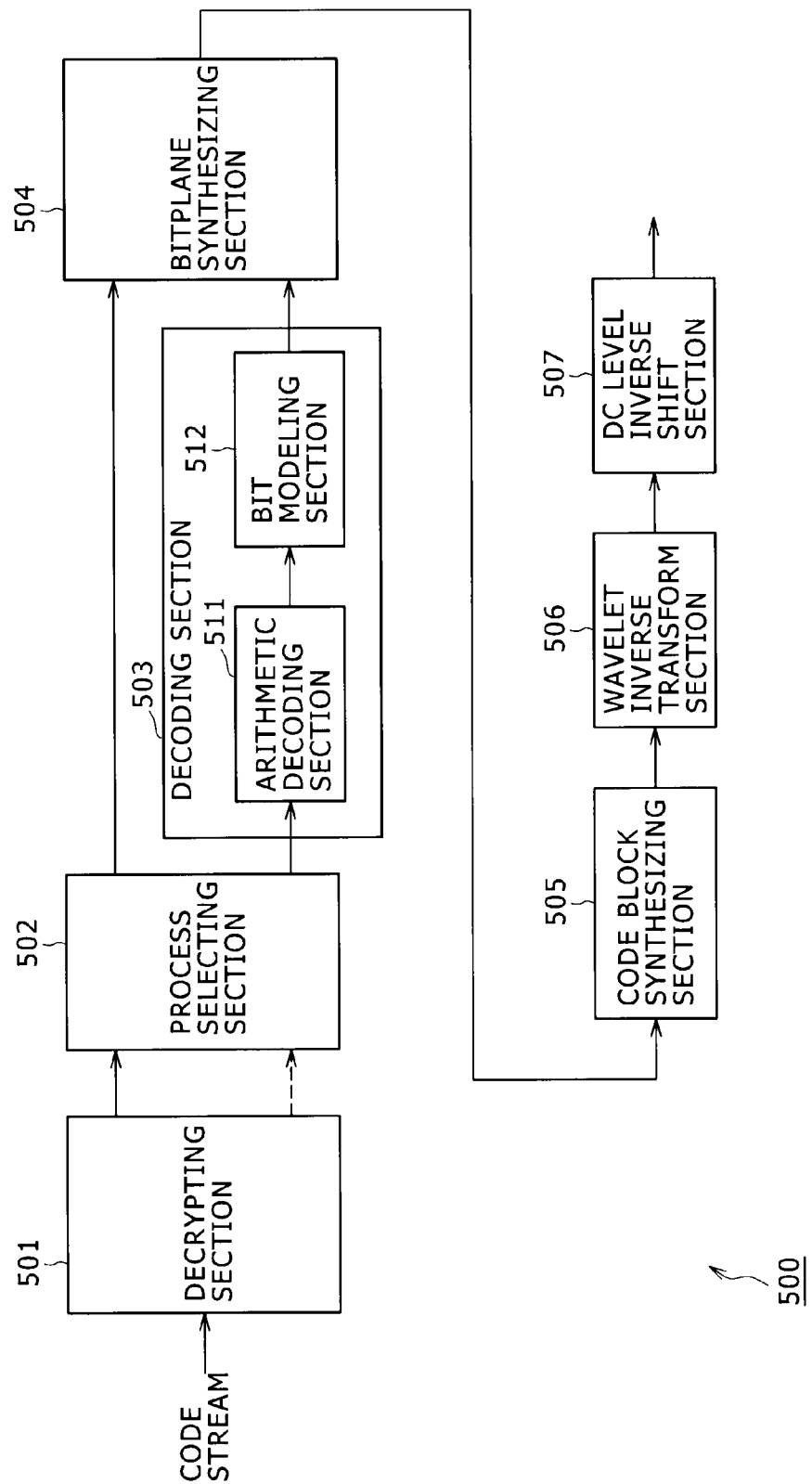
FIG. 21 is a block diagram showing an example of configuration of a decoder to which the present invention is applied.

A decoder (decoding device) corresponding to the encoder 100 as described above will next be described. FIG. 21 is a block diagram showing an example of configuration of the decoder to which the present invention is applied.

The decoder 500 shown in FIG. 21 is a decoding device for decoding a code stream supplied from the encoder 100 by a decoding method corresponding to the coding system of the encoder 100, and thereby obtaining decoded image data.

The decoder 500 decrypts the code stream supplied from the encoder 100, identifies a bitplane where selection of compressed data or non-compressed data in the encoder 100 is changed, and decodes each bitplane according to the selection of the encoder 100. That is, the decoder 500 decodes a bitplane coded by the encoder 100 by the decoding method corresponding to the coding system of the encoder 100, and uses a bitplane not coded by the encoder 100 as it is without decoding the bitplane. That is, the decoder 500 decodes bitplanes as required, synthesizes bitplanes, and thereby generates baseband image data (obtains decoded image data).

Incidentally, in the above description, the encoder 100 packetizes and outputs the code stream. Thus, decoding the output of the encoder 100 actually needs a packet analyzing process that analyzes the packets and which extracts the code stream. However, because this packet analyzing process can be performed by an arbitrary method, description of the packet analyzing process will be omitted in the following in order to simplify description.

As shown in FIG. 21, the decoder 500 has a decrypting section 501, a process selecting section 502, a decoding section 503, a bitplane synthesizing section 504, a code block synthesizing section 505, a wavelet inverse transform section 506, and a DC level inverse shift section 507.

The decrypting section 501 decrypts the supplied code stream. For example, the decrypting section 501 extracts control information on the selection of compressed data and non-compressed data in the encoder 100, the control information being embedded in the code stream, and determines whether a bitplane as processing object is coded on the basis of the control information. More specifically, for example, the decrypting section 501 decrypts the code stream according to the syntax of JPEG2000, and reads two highest-order bits of SPcod or SPcoc shown in FIG. 8. Then, the decrypting section 501 determines the number of high-order bits whose bitplanes are EBCOT-coded on the basis of the read value.

That is, in this example, information indicating a bitplane (position) where the encoder 100 changes the selection of compressed data or non-compressed data is embedded as control information in the code stream. In other words, this control information indicates whether the data as processing object is compressed data or non-compressed data in predetermined units (for example bitplanes). According to the contents of the control information, the decrypting section 501 determines whether the bitplane as processing object is coded, that is, whether the data as processing object is compressed data in predetermined data units.

The control information may have any contents as long as the contents indicate directly or indirectly whether the data as processing object is compressed data or non-compressed data. For example, the contents may be the number of bitplanes for which compressed data is selected or the number of bitplanes for which non-compressed data is selected. In addition, the contents may be a bitplane number indicating a bitplane in which selection is changed or identifying information indicating whether the data as processing object is compressed data or non-compressed data for each bitplane. Further, the contents may be an operation parameter used in an operation for determining a criterion for determining whether the data as processing object is compressed data. The decrypting section 501 determines whether the data as processing object is compressed data for each predetermined data unit by a method corresponding to the contents of the control information.

Incidentally, the control information on the selection of compressed data and non-compressed data in the encoder 100 may be supplied in advance separately from the code stream. In this case, the decrypting section 501 determines whether the bitplane as processing object is coded on the basis of the information. In addition, the number of bitplanes coded by the encoder 100 may be determined in advance, and information on the number of bitplanes may be provided to the decoder 500 in advance. In this case, as decryption of the code stream, the decrypting section 501 counts the number of bitplanes that have been processed thus far, determines that the data as processing object is compressed data until the count value exceeds the predetermined number, and determines that the data as processing object is non-compressed data when the count value exceeds the predetermined number.

That is, the code stream supplied to the decrypting section 501 is data generated by coding a part or all of image data. The decrypting section 501 decrypts such a code stream, and determines whether to decode the code stream for each predetermined data unit. The decrypting section 501 supplies a result of such decryption to the process selecting section 502 together with the code stream in bitplane units.

The process selecting section 502 determines whether the bitplane as processing object is coded on the basis of the result of the decryption of the decrypting section 501. When the process selecting section 502 determines that the bitplane as processing object is coded, the process selecting section 502 supplies the code stream (compressed data) of the bitplane as processing object to the decoding section 503. When the process selecting section 502 determines that the bitplane as processing object is not coded, the process selecting section 502 supplies the code stream (non-compressed data) of the bitplane as processing object to the bitplane synthesizing section 504.

The decoding section 503 decodes the code stream (compressed data) in a bitplane unit by the decoding method corresponding to the coding of the encoder 100. The decoding section 503 supplies a result of the decoding (non-compressed data) to the bitplane synthesizing section 504. In the example of FIG. 21, the decoding section 503 has an arithmetic decoding section 511 and a bit modeling section 512. The arithmetic decoding section 511 decodes the code stream. The bit modeling section 512 generates wavelet coefficients expanded into bitplanes.

The bitplane synthesizing section 504 synthesizes wavelet coefficients expanded into bitplanes, and thereby generates wavelet coefficients in code block units. The code block synthesizing section 505 synthesizes the coefficient data in code block units, and thereby generates coefficient data of each subband. The code block synthesizing section 505 supplies the coefficient data of each subband to the wavelet inverse transform section 506. The wavelet inverse transform section 506 subjects the wavelet coefficients supplied thereto to a wavelet inverse transform, and thereby generates baseband image data. As required, the DC level inverse shift section 507 performs a DC level inverse shift process that puts back the DC component of the image data to an original level by an amount by which the DC component of the image data is shifted at a time of the coding. The DC level inverse shift section 507 outputs the image data after the DC level inverse shift process.

As described above, the decoder 500 can obtain decoded image data by decoding the code stream of each bitplane as appropriate according to the selection of compressed data or non-compressed data for each bitplane by the encoder 100. That is, the decoder 500 can properly decode the code stream in which the encoder 100 omits entropy coding of a part of bitplanes. Further, in this case, the decoder 500 can reduce the processing amount of the decoding process as compared with an ordinary case of decoding all bitplanes.

[Description of Operation]

Figure 22:
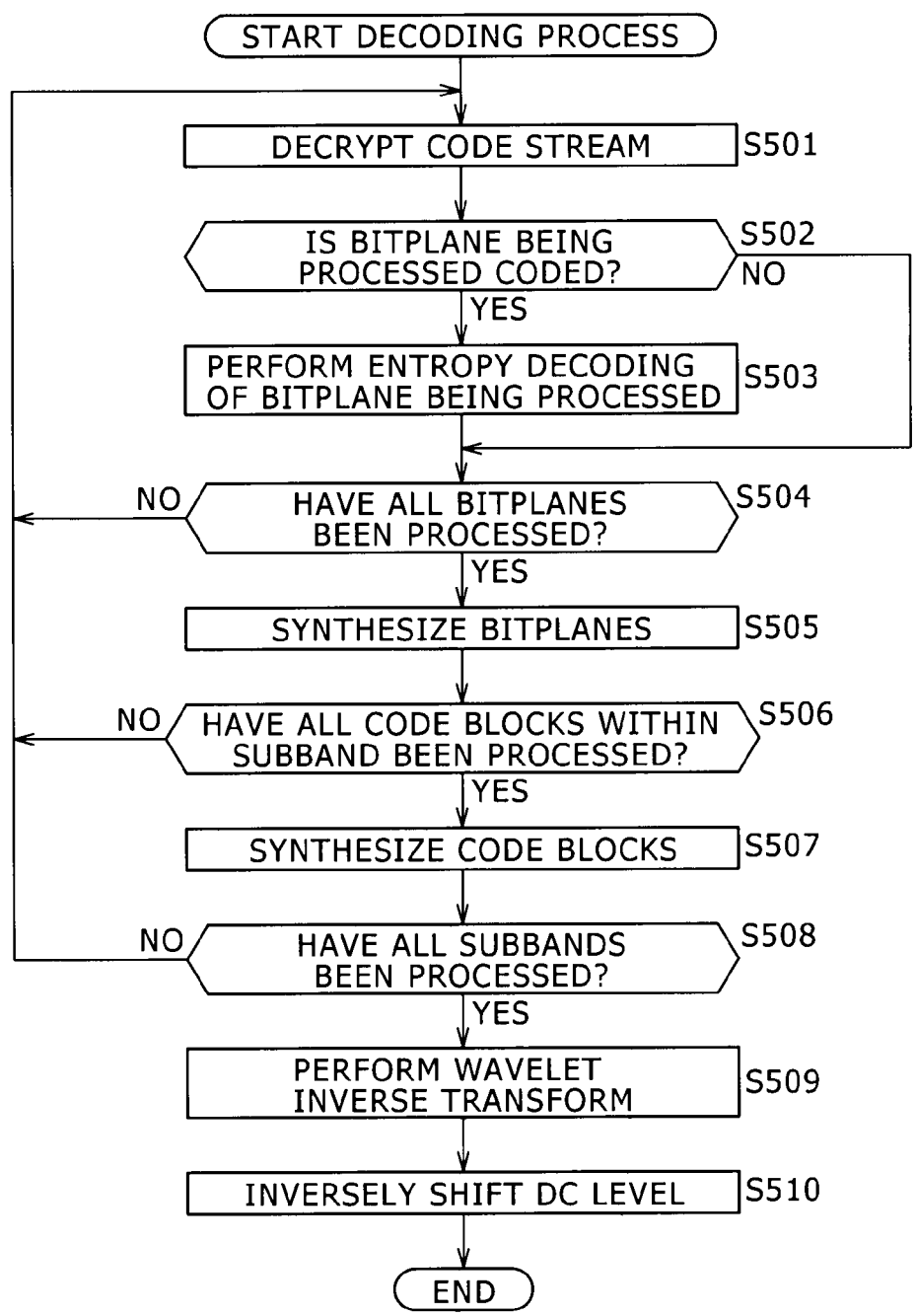
FIG. 22 is a flowchart of assistance in explaining an example of a flow of a decoding process.

An example of a flow of the decoding process by the decoder 500 will be described with reference to a flowchart of FIG. 22. Incidentally, the decoder 500 repeatedly performs the decoding process to be described below in picture units.

When the decoding process is started, the decrypting section 501 of the decoder 500 decrypts a code stream supplied thereto in Step S501. In Step S502, the process selecting section 502 determines whether a bitplane as processing object is coded on the basis of a result of the decryption. When the process selecting section 502 determines that the bitplane as processing object is coded, that is, that the code stream as processing object is compressed data, the process selecting section 502 advances the process to Step S503.

In Step S503, the decoding section 503 performs entropy decoding of the code stream of the bitplane as processing object, that is, the compressed data. The decoding section 503 then advances the process to step S504. When the process selecting section 502 determines in Step S502 that the bitplane as processing object is not coded, that is, that the code stream as processing object is non-compressed data, the process selecting section 502 advances the process to Step S504.

In Step S504, the bitplane synthesizing section 504 accumulates the non-compressed data of the bitplane as processing object, and determines whether all bitplanes within a code block as processing object have been processed. When the bitplane synthesizing section 504 determines that there is a bitplane that has not been processed yet, the bitplane synthesizing section 504 returns the process to Step S501, changes the processing object to a next bitplane, and makes the process from Step S501 on down repeated.

When the bitplane synthesizing section 504 determines in Step S504 that all the bitplanes within the code block as processing object have been processed after the process of steps S501 to S504 is performed repeatedly, the bitplane synthesizing section 504 advances the process to Step S505. In Step S505, the bitplane synthesizing section 504 synthesizes the accumulated non-compressed data, and thereby generates wavelet coefficients in a code block unit.

In Step S506, the code block synthesizing section accumulates the wavelet coefficients of the code block as processing object, and determines whether all code blocks within a subband as processing object have been processed. When the code block synthesizing section determines that there is a code block that has not been processed yet, the code block synthesizing section returns the process to Step S501, changes the processing object to a next code block, and makes the process from Step S501 on down repeated.

When the code block synthesizing section 505 determines in Step S506 that all the code blocks within the subband as processing object have been processed after the process of steps S501 to S506 is performed repeatedly, the code block synthesizing section 505 advances the process to Step S507. In Step S507, the code block synthesizing section 505 synthesizes the accumulated wavelet coefficients, and thereby generates wavelet coefficients in a subband unit.

In Step S508, the wavelet inverse transform section 506 accumulates the generated wavelet coefficients in the subband unit, and determines whether all subbands have been processed. When the wavelet inverse transform section 506 determines that there is a subband that has not been processed yet, the wavelet inverse transform section 506 returns the process to Step S501, changes the processing object to a next subband, and makes the process from Step S501 on down repeated.

When the wavelet inverse transform section 506 determines in Step S508 that all the subbands have been processed after the process of steps S501 to S508 is performed repeatedly, the wavelet inverse transform section 506 advances the process to Step S509. In step S509, the wavelet inverse transform section 506 subjects the accumulated wavelet coefficients to a wavelet inverse transform, and thereby generates baseband decoded image data. In Step S510, the DC level inverse shift section 507 shifts a DC level according to an amount of shifting in the encoder 100 in a direction opposite to the direction of the shifting by the encoder 100. Then the decoding process is ended.

As described above, the decoding process is performed while the code stream is decrypted. Thus, the decoder 500 can properly decode the code stream coded by the encoder 100, and reduce the processing amount of the decoding process.

The encoder 100 and the decoder 500 described above may include constitutions other than those described above, of course. In addition, the encoder 100 and the decoder 500 may be formed not only as one device but also as a system composed of a plurality of devices. For example, the encoder 100 and the decoder 500 may be formed as an editing device for the digital cinema, an archive system, an image database, a medical image recoding system, a network server, a nonlinear editing device, an authoring tool on a PC, a software module thereof, and the like.

The series of processes described above can be carried out by hardware as well as by software. In this case, the encoder 100 and the decoder 500 may be formed as a personal computer as shown in FIG. 23, for example.

In FIG. 23, a CPU (Central Processing Unit) 601 of the personal computer 600 performs various processes according to a program stored in a ROM (Read Only Memory) 602 or a program loaded from a storing section 613 into a RAM (Random Access Memory) 603. The RAM 603 also stores data necessary for the CPU 601 to perform the various processes as appropriate.

The CPU 601, the ROM 602, and the RAM 603 are interconnected via a bus 604. The bus 604 is also connected with an input-output interface 610.

The input-output interface 610 is connected with an input section 611 composed of a keyboard, a mouse and the like, an output section 612 composed of a display formed by a CRT (Cathode Ray Tube), an LCD (Liquid Crystal Display) or the like, a speaker, and the like, the storing section 613 composed of a hard disk and the like, and a communicating section 614 composed of a modem and the like. The communicating section 614 performs a communicating process via a network including the Internet.

The input-output interface 610 is also connected with a drive 615 as required. Removable media 621 such as a magnetic disk, an optical disk, a magneto-optical disk, a semiconductor memory and the like are loaded into the drive 615 as appropriate. A computer program read from these removable media is installed into the storing section 613 as required.

When the series of processes described above is to be carried out by software, a program constituting the software is installed from a network or a recording medium.

As shown in FIG. 23, for example, the recording medium is not only formed by the removable media 621 distributed to users to distribute the program separately from the device proper and having the program recorded thereon, the removable media 621 including a magnetic disk (including flexible disks), an optical disk (including CD-ROM (Compact Disk-Read Only Memory) and DVD (Digital Versatile Disk)), a magneto-optical disk (including MD (Mini-Disk)), a semiconductor memory and the like, but also formed by the ROM 602, the hard disk included in the storing section 613, or the like that has the program recorded thereon and which is distributed to the user in a state of being incorporated in the device proper in advance.

It is to be noted that in the present specification, the steps describing the program recorded on the recording medium include not only processes carried out in time series in the described order but also processes carried out in parallel or individually and not necessarily in time series.

In addition, in the present specification, a system refers to an apparatus as a whole formed by a plurality of devices.

Incidentally, a constitution described above as one device may be divided and formed as a plurality of devices. Conversely, constitutions described above as a plurality of devices may be integrated with each other and formed as one device. In addition, a constitution other than the above-described constitutions may be added to the constitution of each device, of course. Further, a part of the constitution of a device may be included in the constitution of another device as long as the constitution and operation of the system as a whole are the same in effect. That is, embodiments of the present invention are not limited to the above-described embodiments, and are susceptible of various changes without departing from the spirit of the present invention.

The present application contains subject matter related to that disclosed in Japanese Priority Patent Application JP 2008-263470 filed in the Japan Patent Office on Oct. 10, 2008, the entire content of which is hereby incorporated by reference.

What is claimed is:

1. An information processing device comprising:
bitplane expanding means for expanding image data into bitplanes as sets of bits at identical places in each unit of a predetermined number of pieces of data each having a bit depth of a plurality of bits;
coding means for coding said image data expanded by said bitplane expanding means in each said bitplane in predetermined order;
selecting means for, when a compression ratio of compressed data of each said bitplane, said compressed data being generated by coding by said coding means, is higher than a target compression ratio, selecting said compressed data as a result of coding of said image data, and when the compression ratio of the compressed data of each said bitplane is equal to or lower than the target compression ratio, selecting non-compressed data, said non-compressed data being said image data of each said bitplane before being coded by said coding means, as a result of coding of said image data; and
selection controlling means for controlling said coding means to stop a coding process and selecting said non-compressed data for a bitplane situated at a position subsequent to a bitplane for which said non-compressed data is selected by said selecting means in said predetermined order.

2. The information processing device according to claim 1, wherein said coding means performs said coding by EBCOT (Embedded Block Coding with Optimized Truncation) of JPEG (Joint Photographic Experts Group) 2000.

3. The information processing device according to claim 1, wherein said predetermined order is an order from a high-order side to a low-order side of said bit depth.

4. The information processing device according to claim 1, wherein when a number of bitplanes for which said compressed data is selected as a result of coding of said image data reaches a maximum number, said selecting means selects said non-compressed data as a result of coding of said image data regardless of said compression ratio.

5. The information processing device according to claim 1, wherein said selecting means includes:
compression ratio calculating means for calculating the compression ratio of the compressed data of each said bitplane; and
comparing and selecting means for comparing said compression ratio calculated by said compression ratio calculating means with said target compression ratio, and selecting said compressed data as a result of coding of said image data when said compression ratio is higher than said target compression ratio, and selecting said non-compressed data as a result of coding of said image data when said compression ratio is equal to or lower than said target compression ratio.

6. The information processing device according to claim 1, further comprising:
wavelet transform means for transforming said image data into coefficient data of each subband; and
determining means for determining magnitude relation between the compression ratio of the compressed data of each said bitplane and said target compression ratio;
wherein said bitplane expanding means expands each unit of a predetermined number of pieces of said coefficient data obtained by transformation by said wavelet transform means into bitplanes, and
said determining means makes determination for said compression ratio using said target compression ratio set independently for each said subband.

7. The information processing device according to claim 6, further comprising:
setting means for setting said target compression ratio;
wherein said determining means makes determination for said compression ratio using said target compression ratio set by said setting means.

8. The information processing device according to claim 1, further comprising:
adding means for adding information indicating a position at which said selecting means changes selection of the result of coding of said image data from said compressed data to said non-compressed data to the result of coding of said image data.

9. An information processing method of an information processing device, said information processing method comprising the steps of:
expanding image data into bitplanes as sets of bits at identical places in each unit of a predetermined number of pieces of data each having a bit depth of a plurality of bits;
coding said image data expanded into said bitplanes in each said bitplane in predetermined order;
when a compression ratio of compressed data of each said bitplane, said compressed data being generated by coding, is higher than a target compression ratio, selecting said compressed data as a result of coding of said image data, and when the compression ratio of the compressed data of each said bitplane is equal to or lower than the target compression ratio, selecting non-compressed data, the non-compressed data being said image data of each said bitplane before being coded, as a result of coding of said image data; and
stopping a coding process and selecting said non-compressed data for a bitplane situated at a position subsequent to a bitplane for which the non-compressed data is selected in said predetermined order.

10. An information processing device comprising:
bitplane expanding means for expanding image data into bitplanes as sets of bits at identical places in each unit of a predetermined number of pieces of data each having a bit depth of a plurality of bits;
coding means for coding said image data expanded by said bitplane expanding means in each said bitplane in predetermined order;
selecting means for selecting, for a predetermined number of said bitplanes, compressed data of each said bitplane, said compressed data being generated by coding by said coding means, as a result of coding of said image data; and
selection controlling means for controlling said coding means to stop a coding process and selecting non-compressed data, said non-compressed data being said image data of each said bitplane before being coded by said coding means, as a result of coding of said image data for a bitplane situated at a position subsequent to said predetermined number of bitplanes for which said compressed data is selected by said selecting means in said predetermined order.

11. The information processing device according to claim 10, wherein said predetermined order is an order from a high-order side to a low-order side of said bit depth.

12. The information processing device according to claim 10, further comprising:
wavelet transform means for transforming said image data into coefficient data of each subband;
wherein said bitplane expanding means expands each unit of a predetermined number of pieces of said coefficient data obtained by transformation by said wavelet transform means into bitplanes, and
said selecting means selects said compressed data as a result of coding of said image data for said predetermined number of said bitplanes, said predetermined number being set independently for each said subband.

13. The information processing device according to claim 10, further comprising:
setting means for setting said predetermined number;
wherein said selecting means selects said compressed data as a result of coding of said image data for said predetermined number of said bitplanes, said predetermined number being set by said setting means.

14. The information processing device according to claim 10, further comprising:
adding means for adding information indicating a position at which said selecting means changes selection of the result of coding of said image data from said compressed data to said non-compressed data to the result of coding of said image data.

15. An information processing method of an information processing device, said information processing method comprising the steps of:
expanding image data into bitplanes as sets of bits at identical places in each unit of a predetermined number of pieces of data each having a bit depth of a plurality of bits;
coding said image data expanded into said bitplanes in each said bitplane in predetermined order;
selecting, for a predetermined number of said bitplanes, compressed data of each said bitplane, said compressed data being generated by coding, as a result of coding of said image data; and
stopping a coding process and selecting non-compressed data, said non-compressed data being said image data of each said bitplane before being coded, as a result of coding of said image data for a bitplane situated at a position subsequent to said predetermined number of bitplanes for which said compressed data is selected in said predetermined order.

16. An information processing device comprising:
a bitplane expanding section expanding image data into bitplanes as sets of bits at identical places in each unit of a predetermined number of pieces of data each having a bit depth of a plurality of bits;
a coding section coding said image data expanded by said bitplane expanding section in each said bitplane in predetermined order;
a selecting section, when a compression ratio of compressed data of each said bitplane, said compressed data being generated by coding by said coding section, is higher than a target compression ratio, selecting said compressed data as a result of coding of said image data, and when the compression ratio of the compressed data of each said bitplane is equal to or lower than the target compression ratio, selecting non-compressed data, said non-compressed data being said image data of each said bitplane before being coded by said coding section, as a result of coding of said image data; and
a selection controlling section controlling said coding section to stop a coding process and selecting said non-compressed data for a bitplane situated at a position subsequent to a bitplane for which said non-compressed data is selected by said selecting section in said predetermined order.

17. An information processing device comprising:
a bitplane expanding section expanding image data into bitplanes as sets of bits at identical places in each unit of a predetermined number of pieces of data each having a bit depth of a plurality of bits;
a coding section coding said image data expanded by said bitplane expanding section in each said bitplane in predetermined order;
a selecting section selecting, for a predetermined number of said bitplanes, compressed data of each said bitplane, said compressed data being generated by coding by said coding section, as a result of coding of said image data; and
a selection controlling section controlling said coding section to stop a coding process and selecting non-compressed data, said non-compressed data being image data of each said bitplane before being coded by said coding section, as a result of coding of said image data for a bitplane situated at a position subsequent to said predetermined number of bitplanes for which said compressed data is selected by said selecting section in said predetermined order.

* * * * *